United States Patent
Yan et al.

(10) Patent No.: US 11,997,556 B2
(45) Date of Patent: May 28, 2024

(54) COMMUNICATION METHOD AND COMMUNICATIONS APPARATUS

(71) Applicant: Huawei Technologies Co., Ltd., Shenzhen (CN)

(72) Inventors: Le Yan, Shenzhen (CN); Hongping Zhang, Shanghai (CN); Qinghai Zeng, Shanghai (CN); Tingting Geng, Shanghai (CN); Shitong Yuan, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 312 days.

(21) Appl. No.: 17/358,746

(22) Filed: Jun. 25, 2021

(65) Prior Publication Data

US 2021/0321313 A1 Oct. 14, 2021

Related U.S. Application Data

(63) Continuation of application No. PCT/CN2019/127836, filed on Dec. 24, 2019.

(30) Foreign Application Priority Data

Dec. 26, 2018 (CN) .......................... 201811603870.2

(51) Int. Cl.
*H04W 36/00* (2009.01)
*H04W 36/08* (2009.01)
*H04W 36/30* (2009.01)

(52) U.S. Cl.
CPC ....... *H04W 36/08* (2013.01); *H04W 36/0083* (2013.01); *H04W 36/30* (2013.01)

(58) Field of Classification Search
CPC ......... H04W 36/0072; H04W 36/0077; H04W 36/0083; H04W 36/008355;
(Continued)

(56) References Cited

U.S. PATENT DOCUMENTS

| | | | | |
|---|---|---|---|---|
| 2014/0073329 | A1* | 3/2014 | Kang | H04W 36/30 455/439 |
| 2018/0007604 | A1* | 1/2018 | Pillay-Esnault | H04W 36/026 |
| 2020/0022035 | A1* | 1/2020 | Kadiri | H04W 36/0072 |

FOREIGN PATENT DOCUMENTS

| | | |
|---|---|---|
| CN | 101668320 A * | 3/2010 |
| CN | 103188744 A | 7/2013 |

(Continued)

OTHER PUBLICATIONS

Vivo, "Signaling procedure for conditional handover," 3GPP TSG-RAN WG2 Meeting #104, R2-1816334, Nov. 12-16, 2018, 5 pages.

(Continued)

*Primary Examiner* — Matthew W Genack
(74) *Attorney, Agent, or Firm* — Slater Matsil, LLP

(57) ABSTRACT

This application provides a communication method and a communications apparatus. The method includes: receiving, by a terminal device, conditional handover configuration information from a first network device, where the first network device is a network device to which a serving cell belongs, and the serving cell is a cell that currently accessed by the terminal belongs; and determining, by the terminal device, a first target cell based on the conditional handover configuration information.

19 Claims, 9 Drawing Sheets

(58) Field of Classification Search
CPC ... H04W 36/008357; H04W 36/00838; H04W 36/08; H04W 36/30; H04W 36/302; H04W 36/304; H04W 36/305; H04W 36/32; H04W 36/322; H04W 36/324; H04W 36/362

See application file for complete search history.

(56) References Cited

FOREIGN PATENT DOCUMENTS

| CN | 105228200 A | 1/2016 |
|---|---|---|
| CN | 106063329 A | 10/2016 |
| CN | 107454634 A | 12/2017 |
| CN | 107889145 A | 4/2018 |
| CN | 108243459 A | 7/2018 |
| CN | 109392031 A | 2/2019 |
| IN | 108632926 A | 10/2018 |

OTHER PUBLICATIONS

Intel Corporation, "Discussion of conditional handover", 3GPP TSG RAN WG2 Meeting #103bis, R2-1814051, Chengdu, China, Oct. 8-12, 2018, 4 pages.

Nokia et al., "Configuration Management for Conditional Handover", 3GPP TSG-RAN WG2 Meeting #101, R2-1803347, Athens, Greece, Feb. 26-Mar. 2, 2018, 3 pages.

Mediatek Inc., "Conditional Handover Procedures", 3GPP TSG-RAN WG2 Meeting #104, R2-1816959, Spokane, WA, USA, Nov. 12-16, 2018, 6 pages.

LG Electronics, Inc., "Conditional handover procedure", 3GPP TSG-RAN2#100, R2-1713820, Reno, NV, US, Nov. 27-Dec. 1, 2017, 3 pages.

Lenovo, et al., "Conditional handover in NR system", 3GPP TSG-RAN WG2 Meeting#100, R2-1712950, Reno, NV, US, Nov. 27-Dec. 1, 2017, 3 pages.

3GPP TS 36.300 V15.3.0 (Sep. 2018), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15), 358 pages.

Astri et al., "Discussion on Conditional Handover in NR", 3GPP TSG-RAN WG2 Meeting #100, R2-1713747, Reno, NV, US, Nov. 27 Dec. 1, 2017, 6 pages.

Lenovo, et al., "Conditional handover in NR system", 3GPP TSG-RAN WG2 Meeting#101, R2-1803044, Athens, Greece, Feb. 26-Mar. 2, 2018, 3 pages.

3GPP TS 36.331 V15.3.0 (Sep. 2018), 3rd Generation Partnership Project; Technical Specification Group Radio Access Network; Evolved Universal Terrestrial Radio Access (E-UTRA); Radio Resource Control (RRC); Protocol specification (Release 15), 918 pages.

3GPP TS 38.300 V15.3.1 (Oct. 2018), 3rd Generation Partnership Project; Technical Specification Group Radio Access Network; NR; NR and NG-RAN Overall Description; Stage 2 (Release 15), 92 pages.

3GPP TS 38.331 V15.3.0 (Sep. 2018), 3rd Generation Partnership Project; Technical Specification Group Radio Access Network; NR; Radio Resource Control (RRC) protocol specification (Release 15), 445 pages.

3GPP TS 38.423 V15.1.0 (Sep. 2018), 3rd Generation Partnership Project; Technical Specification Group Radio Access Network; NG-RAN; Xn application protocol (XnAP) (Release 15), 263 pages.

3GPP TS 36.423 V15.3.0 (Sep. 2018), 3rd Generation Partnership Project; Technical Specification Group Radio Access Network; Evolved Universal Terrestrial Radio Access Network (E-UTRAN); X2 application protocol (X2AP) (Release 15), 401 pages.

* cited by examiner

COMMUNICATION METHOD AND COMMUNICATIONS APPARATUS

CROSS-REFERENCE TO RELATED APPLICATIONS

This application is a continuation of International Application No. PCT/CN2019/127836, filed on Dec. 24, 2019, which claims priority to Chinese Patent Application No. 201811603870.2, filed on Dec. 26, 2018. The disclosures of the aforementioned applications are hereby incorporated by reference in their entireties.

TECHNICAL FIELD

This application relates to the communications field, and more specifically, to a communication method and a communications apparatus.

BACKGROUND

In a mobile communications system, mobility management of a terminal device in connected mode is controlled by a network device. To be specific, the network device sends a handover message to indicate a target cell to which the terminal device is to be handed over and a handover method.

Whether the handover message can be successfully sent strongly depends on serving link quality of a source cell. A serving link with poor quality causes a failure in sending the handover message. Consequently, the terminal device cannot be handed over, and data transmission is affected. In a long term evolution (LTE) or a 5th generation (5G) mobile communications technology (especially in a high-frequency scenario), fast channel quality attenuation, fast movement of a terminal device, or blocking by an object all affect serving link quality. These factors may cause a failure in sending a handover message, resulting in a low handover success rate.

Therefore, how to improve a handover success rate becomes an urgent problem to be resolved.

SUMMARY

This application provides a communication method and a communications apparatus. The method can improve a handover success rate.

According to a first aspect, a communication method is provided. The method includes the following.

A terminal device receives conditional handover configuration information from a first network device, where the first network device is a network device to which a serving cell belongs, and the serving cell is a cell currently accessed by the terminal device.

The terminal device determines a first target cell based on the conditional handover configuration information.

It should be understood that in this embodiment of this application, the conditional handover configuration information may be carried in a radio resource control (RRC) message.

It should be understood that, in this embodiment of this application, "conditional handover" means that a specific condition needs to be satisfied when the terminal device performs a handover. To be specific, the condition may be referred to as a trigger condition of the handover performed by the terminal device. The terminal device may determine, based on signal quality of a serving cell and signal quality of a neighboring cell, the first target cell that satisfies the trigger condition.

Optionally, after the terminal device determines the first target cell that satisfies the trigger condition, the method may further include: The terminal device performs a handover, that is, the terminal device is handed over from the serving cell to the first target cell. For example, the terminal device performs random access to the first target cell, to be handed over to the first target cell.

In this embodiment of this application, the first network device sends the configuration information to the terminal device, so that the terminal device can determine a target cell based on the configuration information, and randomly access the determined target cell, to complete a handover procedure, thereby improving a handover success rate.

It should be understood that the first target cell may be a neighboring cell of the serving cell. In this embodiment of this application, one network device may serve a plurality of cells. The handover in this embodiment of this application may be a handover in the serving cell, may be a handover between a plurality of cells served by one network device, or may be a cell handover between different network devices. This embodiment of this application is not limited thereto.

Specifically, in this embodiment of this application, when the signal quality of the serving cell deteriorates, the terminal device may determine the target cell based on the conditional handover configuration information sent by the first network device. Compared with the current technology in which when signal quality of a current serving cell deteriorates, a network device sends a handover message to indicate, to a terminal device, a target cell to which the terminal device needs to be handed over, this embodiment of this application can ensure a success rate of sending the configuration information when the first network device sends the configuration information to the terminal device, for example, the first network device sends the conditional handover configuration information to the terminal device when link communication quality is relatively good. Further, the terminal device determines the target cell based on the configuration information, and performs random access to the determined target cell, to complete a handover procedure, thereby improving a handover success rate.

With reference to the first aspect, in an implementation of the first aspect, the conditional handover configuration information is used to configure a first measurement object and a handover condition threshold, where a measurement result of the first measurement object and the handover condition threshold are used to determine whether a trigger condition of a conditional handover is satisfied.

That the terminal device determines a first target cell based on the conditional handover configuration information includes the following.

The terminal device determines a candidate target cell that corresponds to the first measurement object and that satisfies the trigger condition as the first target cell based on the measurement result of the first measurement object and the handover condition threshold.

In other words, after obtaining the conditional handover configuration information, the terminal device measures the first measurement object. If a measurement result of a candidate target cell corresponding to the measurement object satisfies the trigger condition of the handover, the terminal device may determine the candidate target cell as the first target cell. After determining the first target cell, the terminal device may perform a handover, that is, is handed over from the serving cell to the first target cell.

With reference to the first aspect, in an implementation of the first aspect, before the terminal device receives the conditional handover configuration information from the first network device, the method further includes the following.

The terminal device receives measurement configuration information from the first network device, where the measurement configuration information includes at least one measurement identifier, and a measurement object and a reporting configuration that are associated with each measurement identifier, and the reporting configuration is used to configure a reporting event and a reporting condition threshold corresponding to the reporting event.

The conditional handover configuration information includes a first measurement identifier and the handover condition threshold; or the conditional handover configuration information includes a first measurement identifier and a handover condition variable threshold, where the handover condition threshold is determined based on the handover condition variable threshold and a reporting condition threshold associated with the first measurement identifier, where the first measurement identifier is one of the at least one measurement identifier, and a measurement object associated with the first measurement identifier is the first measurement object.

In this embodiment of this application, the conditional handover configuration information is associated with the measurement configuration information. Because some information has been configured by using the measurement configuration information, the conditional handover configuration information can be used to implement the handover by configuring only a part of information. Therefore, this embodiment of this application can reduce a size of the conditional handover configuration information, signaling overheads, and transmission resource overheads.

With reference to the first aspect, in an implementation of the first aspect, the conditional handover configuration information includes the first measurement object and the handover condition threshold.

It should be understood that the conditional handover configuration information carries the first measurement object, that is, the configuration information carries the first measurement object (for example, frequency information) instead of the measurement identifier. The terminal device can directly determine the measurement object based on information carried in the conditional handover configuration information, with no need to refer to the measurement configuration.

In this embodiment of this application, the conditional handover configuration information may be directly used to configure the first measurement object and the handover condition threshold, with no need to refer to specific content of the measurement configuration information, so that the terminal device can directly and quickly determine the measurement object that needs to be measured.

Further, because there is no need to refer to the measurement configuration information, the network device may not send the measurement configuration information. Therefore, this embodiment of this application can reduce signaling overheads.

With reference to the first aspect, in an implementation of the first aspect, the conditional handover configuration information further includes at least one of the following information: a measurement identifier associated with the first measurement object and the handover condition threshold, an event corresponding to the handover condition threshold, a hysteresis value, and a time to trigger TTT.

It should be understood that a measurement identifier included in the configuration information may overlap or may not overlap the measurement identifier included in the measurement configuration information. This embodiment of this application is not limited thereto.

A case in which the conditional handover configuration information includes the measurement object or includes the measurement identifier is described above. Optionally, in an implementation of the first aspect, when the conditional handover configuration information is used to configure a plurality of measurement objects, the conditional handover configuration information may not only include a measurement object but also include a measurement identifier.

For example, a measurement object associated with a first measurement identifier configured in the measurement configuration information is the first measurement object. If the first measurement object, a second measurement object, and a third measurement object need to be configured by using the conditional handover configuration information, the first measurement object can be configured by including the first measurement identifier in the conditional handover configuration information. Therefore, the conditional handover configuration information may include the first measurement identifier, the second measurement object, and the third measurement object, to configure the first measurement object, the second measurement object, and the third measurement object.

With reference to the first aspect, in an implementation of the first aspect, the method further includes the following.

The terminal device sends a first message to a second network device, where the first message is used to notify the second network device of a successful handover of the terminal device, and the second network device is a network device to which the first target cell belongs.

The first message includes at least one of the following information: a cell radio network temporary identifier C-RNTI allocated by the serving cell to the terminal, a cell global identifier CGI of the serving cell, a physical cell identifier PCI of the serving cell, and a message authentication code for integrity MAC-I.

In this embodiment of this application, the second network device may find the serving cell by using the foregoing information included in the first message, and further obtain context information of the terminal device from the network device (that is, the first network device) to which the serving cell belongs. Further, the second network device can communicate with the terminal device.

With reference to the first aspect, in an implementation of the first aspect, the conditional handover configuration information and the measurement configuration information are received by the terminal device by using one piece of signaling.

The network device sends the foregoing information by using one piece of signaling, so that signaling overheads can be reduced.

With reference to the first aspect, in an implementation of the first aspect, the conditional handover configuration information includes at least one of the following information: a cell identifier of the candidate target cell, frequency information of the candidate target cell, a C-RNTI allocated by the candidate target cell to the terminal device, an identifier of a first beam that belongs to the candidate target cell, and a first random access channel (RACH) resource.

With reference to the first aspect, in an implementation of the first aspect, the handover condition threshold includes a first signal quality threshold, where when a difference between signal quality of the candidate target cell and signal quality of the serving cell is greater than or equal to the first signal quality threshold, the candidate target cell satisfies the trigger condition; or the handover condition threshold includes a second signal quality threshold and a third signal quality threshold, where when signal quality of the candidate target cell is greater than or equal to the third signal quality threshold, and signal quality of the serving cell is less than the second signal quality threshold, the candidate target cell satisfies the trigger condition, where the third signal quality threshold is greater than or equal to the second signal quality threshold.

In this embodiment of this application, different handover condition thresholds may be set for different events, so that the terminal device can flexibly determine the first target cell based on an event and a handover condition threshold corresponding to the event, and perform the handover.

With reference to the first aspect, in an implementation of the first aspect, the handover condition threshold corresponds to a quality level, and the quality level is used to indicate a quality value range of the serving cell.

Specifically, a plurality of handover condition thresholds may be configured by using the conditional handover configuration information. In a possible implementation, different handover condition thresholds correspond to different quality levels, and the quality level is used to indicate a quality value range of the serving cell. Alternatively, in another possible implementation, different quality levels may correspond to one of the plurality of handover condition thresholds, and the quality level is used to indicate a quality value range of the serving cell. Alternatively, in another possible implementation, a same quality level may correspond to at least two of the plurality of handover condition thresholds, and the quality level is used to indicate a quality value range of the serving cell.

In other words, in this embodiment of this application, a plurality of handover condition thresholds may be simultaneously configured by using the conditional handover configuration information. The terminal device may select a corresponding handover condition threshold based on a quality level of the serving cell (or a quality value range of the serving cell), to search for the target cell.

Therefore, in this embodiment of this application, the terminal device can use a corresponding handover condition threshold based on a quality status of the serving cell, to properly and flexibly determine the target cell.

With reference to the first aspect, in an implementation of the first aspect, the conditional handover configuration information includes TTT indication information, and the TTT indication information is used to indicate whether the terminal device uses a TTT mechanism to determine the first target cell.

If the TTT indication information indicates that the TTT mechanism does not need to be used, once the terminal device determines that the trigger condition is satisfied, the terminal device is handed over to the target cell that satisfies the trigger condition. If the TTT indication information indicates that the TTT mechanism needs to be used, and the candidate target cell always satisfies the trigger condition only when within a time to trigger (TTT) configured by a network, the terminal device determines the candidate target cell as the first target cell. After the time to trigger is reached, the terminal device is handed over to the first target cell that satisfies the trigger condition.

In this embodiment of this application, the configuration information carries the TTT indication information, to flexibly indicate whether the terminal device needs to use the TTT mechanism. If the TTT indication information indicates that the TTT mechanism does not need to be used, the terminal device may be quickly handed over to the target cell that satisfies the trigger condition. If the TTT indication information indicates that the TTT mechanism needs to be used, the handover is performed only when the candidate target cell always satisfies the trigger condition within a period of time (that is, the time to trigger). This can ensure that the handover is performed when network quality is relatively good and relatively stable. Therefore, service stability can be ensured, and network performance can be improved.

With reference to the first aspect, in an implementation of the first aspect, the conditional handover configuration information includes report-free indication information, and the report-free indication information is used to indicate the terminal device to directly perform random access to the first target cell after determining the first target cell that satisfies the trigger condition, without sending a measurement report to the first network device. Alternatively, in an implementation, the configuration information may not include the report-free indication information. In this case, in this embodiment of this application, the terminal device may be implicitly indicated not to report the measurement report. For example, it is stipulated, according to a preset rule or a protocol, that after the receiving the configuration information sent by the first network device, the terminal device does not need to report the measurement report after a handover condition is triggered, but is handed over to the target cell that satisfies the trigger condition.

In this embodiment of this application, the report-free indication information is carried in the configuration information. After determining the first target cell, the terminal device does not need to send the measurement report, so that signaling overheads can be reduced, and a fast handover can be implemented.

With reference to the first aspect, in an implementation of the first aspect, the conditional handover configuration information includes a fourth signal quality threshold.

That the terminal device determines a first target cell based on the configuration information includes:

The terminal device determines the first target cell based on the conditional handover configuration information when the signal quality of the serving cell is less than the fourth signal quality threshold.

In other words, in this implementation, when the signal quality of the serving cell is relatively good, for example, is greater than or equal to the fourth signal quality threshold, the terminal device may not need to search for the target cell. However, when the signal quality of the serving cell is relatively poor, for example, is less than the fourth signal quality threshold, the terminal device may search for, based on the configuration information, the target cell that satisfies the trigger condition.

Therefore, in this embodiment of this application, an unnecessary handover process performed when the signal quality of the serving cell is relatively good is avoided.

With reference to the first aspect, in an implementation of the first aspect, the conditional handover configuration information is further used to configure a handover cancellation condition, and the method further includes: in a process in which the terminal device determines the first target cell that satisfies the trigger condition, if the handover cancellation condition is satisfied, the terminal device cancels the determining process, and continues to communicate with the serving cell.

With reference to the first aspect, in an implementation of the first aspect, the conditional handover configuration information includes a cancellation condition, where whether the handover cancellation condition is satisfied is determined based on the cancellation condition and the signal quality of the serving cell and/or the signal quality of the candidate target cell.

With reference to the first aspect, in an implementation of the first aspect, the cancellation condition includes a fifth signal quality threshold, and when the signal quality of the serving cell is greater than the fifth signal quality threshold, the handover cancellation condition is satisfied; or the cancellation condition includes a sixth signal quality threshold, and when the signal quality of the candidate target cell is less than a sum of the sixth signal quality threshold and the signal quality of the serving cell, the handover cancellation condition is satisfied.

In this embodiment of this application, when the signal quality of the serving cell becomes better, because the signal quality of the serving cell is relatively good, normal running of services can also be ensured with no need to perform the handover. Therefore, in this embodiment of this application, when the signal quality of the serving cell is relatively good, the process of determining the target cell that satisfies the trigger condition is canceled, to avoid an unnecessary determining process, reduce energy consumption of the terminal device, and reduce implementation complexity of the terminal device.

With reference to the first aspect, in an implementation of the first aspect, that the terminal device cancels the determining process, and continues to communicate with the serving cell includes the following.

The terminal device sends a notification message to the first network device, where the notification message is used to indicate the first network device to release the configuration information.

For example, the conditional handover configuration information includes a cancellation condition, where whether the handover cancellation condition is satisfied is determined based on the cancellation condition and the signal quality of the serving cell and/or the signal quality of the candidate target cell.

For example, after the receiving the conditional handover configuration information, the terminal device may determine, based on link quality, whether to cancel the handover. For example, when the quality of the serving cell becomes better, the terminal device may cancel the handover and continue to communicate with the serving cell.

With reference to the first aspect, in an implementation of the first aspect, in the process in which the terminal device determines the first target cell that satisfies the trigger condition, the method further includes:

The terminal device receives a handover message sent by the first network device, where the handover message includes an identifier of a second target cell and a dedicated random access resource required for accessing the second target cell, and the dedicated random access resource includes a preamble index and a time-frequency resource.

The terminal device stops the determining process, and performs contention-free random access to the second target cell based on the dedicated random access resource.

That the terminal device determines a first target cell based on the conditional handover configuration information includes the following.

The terminal device continues to determine, based on the conditional handover configuration information when the contention-free random access to the second target cell fails, the first target cell that satisfies the trigger condition.

In this embodiment of this application, because the handover message indicates the target cell (the second target cell), the terminal device can directly determine the target cell by using the handover message, with no need to search for the target cell. Therefore, in this embodiment of this application, after obtaining the handover message, the terminal device may stop the process of searching for the first target cell, and is directly handed over to the second target cell, to quickly implement the handover. If the handover to the second target cell fails, the terminal device may continue to search for the first target cell based on the received conditional handover configuration information. After determining the first target cell that satisfies the trigger condition, the terminal device accesses the first target cell. In this way, the terminal device can be prevented from performing an RRC re-establishment process after the handover of the terminal device to the second target cell fails, thereby reducing a service interruption delay.

With reference to the first aspect, in an implementation of the first aspect, after the terminal device completes the handover, the method further includes the following.

The terminal device releases the conditional handover configuration information.

With reference to the first aspect, in an implementation of the first aspect, that the handover is completed includes: The terminal device is successfully handed over to the first target cell.

With reference to the first aspect, in an implementation of the first aspect, before the first target cell is determined, the method further includes: receiving a handover message sent by the first network device, where the handover message includes the identifier of the second target cell; and stopping the process of determining the first target cell, and performing a handover based on the handover message. That the handover is completed includes: The terminal device is successfully handed over to the second target cell.

In other words, the terminal device attempts to hand over to the second target cell based on the handover message, and if the terminal device is successfully handed over to the second target cell, the handover is completed.

For example, the handover message may include information related to a random access channel-less handover (RACH-less HO). In this case, the terminal device does not perform the RACH procedure with the second target cell. That is, the terminal device skips the RACH procedure, and directly sends an RRC reconfiguration complete message to the second target cell, to complete the handover. The information related to the RACH-less HO may include indication information of the RACH-less HO, a timing advance (TA) value, an uplink grant (UL grant), and/or the like.

For another example, the handover message may not include information related to a RACH-less HO. In this case, the terminal device performs a RACH procedure with the second target cell based on random access resource information included in the handover message. After the RACH procedure succeeds, the terminal device sends an RRC reconfiguration complete message to the second target cell, to complete the handover.

In this embodiment of this application, when the terminal device is successfully handed over to the second target cell, the terminal device releases the conditional handover configuration information, to avoid a transmission interruption when the handover to the second target cell fails. For example, when the handover to the second target cell fails, the terminal device may determine, based on the conditional handover configuration information, a cell that can be accessed, to prevent the terminal device from performing RRC re-establishment when the handover to the second target cell fails, thereby reducing a transmission interruption.

According to a second aspect, a communication method is provided. The method includes: A first network device generates conditional handover configuration information, where the first network device is a network device to which a serving cell belongs, and the serving cell is a cell that currently accessed by a terminal device belongs.

The first network device sends the conditional handover configuration information, where the conditional handover configuration information is used by the terminal device to determine a first target cell.

Specifically, in this embodiment of this application, when the signal quality of the serving cell deteriorates, the terminal device may determine the target cell based on the conditional handover configuration information sent by the first network device. Compared with the current technology in which when signal quality of a current serving cell deteriorates, a network device sends a handover message to indicate, to a terminal device, a target cell to which the terminal device needs to be handed over, this embodiment of this application can ensure a success rate of sending the configuration information when the first network device sends the configuration information to the terminal device, for example, the first network device sends the conditional handover configuration information to the terminal device when link communication quality is relatively good. Further, the terminal device determines the target cell based on the configuration information, and performs random access to the determined target cell, to complete a handover procedure, thereby improving a handover success rate.

It should be understood that the second aspect is performed by the first network device, and specific content of the second aspect corresponds to the content of the first aspect performed by the terminal device. For corresponding features of the second aspect and beneficial effects achieved by the second aspect, refer to the descriptions of the first aspect. To avoid repetition, detailed descriptions are appropriately omitted herein.

With reference to the second aspect, in an implementation of the second aspect, the conditional handover configuration information is used to configure a first measurement object and a handover condition threshold, where a measurement result of the first measurement object and the handover condition threshold are used to determine whether a trigger condition of a conditional handover is satisfied.

With reference to the second aspect, in an implementation of the second aspect, before the first network device sends the conditional handover configuration information, the method further includes the following.

The first network device sends measurement configuration information, where the measurement configuration information includes at least one measurement identifier, and a measurement object and a reporting configuration that are associated with each measurement identifier, and the reporting configuration is used to configure a reporting event and a reporting condition threshold corresponding to the reporting event.

The conditional handover configuration information includes a first measurement identifier and the handover condition threshold; or the conditional handover configuration information includes a first measurement identifier and a handover condition variable threshold, where the handover condition threshold is determined based on the handover condition variable threshold and a reporting condition threshold associated with the first measurement identifier, where the first measurement identifier is one of the at least one measurement identifier, and a measurement object associated with the first measurement identifier is the first measurement object.

With reference to the second aspect, in an implementation of the second aspect, the conditional handover configuration information includes the first measurement object and the handover condition threshold.

With reference to the second aspect, in an implementation of the second aspect, the conditional handover configuration information further includes at least one of the following information: a measurement identifier associated with the first measurement object and the handover condition threshold, an event corresponding to the handover condition threshold, a hysteresis value, and a time to trigger TTT.

With reference to the second aspect, in an implementation of the second aspect, the conditional handover configuration information and the measurement configuration information are received by the terminal device by using one piece of signaling.

With reference to the second aspect, in an implementation of the second aspect, the conditional handover configuration information includes at least one of the following information: a cell identifier of the candidate target cell, frequency information of the candidate target cell, a C-RNTI allocated by the candidate target cell to the terminal device, an identifier of a first beam that belongs to the candidate target cell, and a first random access channel RACH resource.

With reference to the second aspect, in an implementation of the second aspect, the handover condition threshold includes a first signal quality threshold, where when a difference between signal quality of the candidate target cell and signal quality of the serving cell is greater than or equal to the first signal quality threshold, the candidate target cell satisfies the trigger condition; or the handover condition threshold includes a second signal quality threshold and a third signal quality threshold, where when signal quality of the candidate target cell is greater than or equal to the third signal quality threshold, and signal quality of the serving cell is less than the second signal quality threshold, the candidate target cell satisfies the trigger condition, where the third signal quality threshold is greater than or equal to the second signal quality threshold.

With reference to the second aspect, in an implementation of the second aspect, the handover condition threshold corresponds to a quality level, and the quality level is used to indicate a quality value range of the serving cell.

With reference to the second aspect, in an implementation of the second aspect, the conditional handover configuration information includes TTT indication information, and the TTT indication information is used to indicate whether the terminal device uses a TTT mechanism to determine the first target cell.

With reference to the second aspect, in an implementation of the second aspect, the conditional handover configuration information includes report-free indication information, and the report-free indication information is used to indicate the terminal device to directly perform random access to the first target cell after determining the first target cell that satisfies the trigger condition, without sending a measurement report to the first network device.

With reference to the second aspect, in an implementation of the second aspect, the conditional handover configuration information includes a fourth signal quality threshold. The conditional handover configuration information is used by the terminal device to determine the first target cell when the signal quality of the serving cell is less than the fourth signal quality threshold.

With reference to the second aspect, in an implementation of the second aspect, the conditional handover configuration information is further used to configure a handover cancellation condition.

The conditional handover configuration information is used to: in a process in which the terminal device determines the first target cell that satisfies the trigger condition, if the handover cancellation condition is satisfied, cancel the determining process, and continue to communicate with the serving cell.

With reference to the second aspect, in an implementation of the second aspect, the conditional handover configuration information includes a cancellation condition, where whether the handover cancellation condition is satisfied is determined based on the cancellation condition and the signal quality of the serving cell and/or the signal quality of the candidate target cell.

With reference to the second aspect, in an implementation of the second aspect, the cancellation condition includes a fifth signal quality threshold, and when the signal quality of the serving cell is greater than the fifth signal quality threshold, the handover cancellation condition is satisfied; or the cancellation condition includes a sixth signal quality threshold, and when the signal quality of the candidate target cell is less than a sum of the sixth signal quality threshold and the signal quality of the serving cell, the handover cancellation condition is satisfied.

With reference to the second aspect, in an implementation of the second aspect, the method further includes the following.

The first network device receives a notification message sent by the terminal device, where the notification message is used to indicate the first network device to release the configuration information.

With reference to the second aspect, in an implementation of the second aspect, the method further includes the following.

The first network device sends a handover message to the terminal device, where the handover message includes an identifier of a second target cell and a dedicated random access resource required for accessing the second target cell, and the dedicated random access resource includes a preamble index and a time-frequency resource.

The conditional handover configuration information is used by the terminal device to continue to determine, based on the conditional handover configuration information when contention-free random access to the second target cell fails, the first target cell that satisfies the trigger condition.

According to a third aspect, a communication method is provided. The method includes:

A fourth network device (for example, a network device to which a candidate target cell belongs) receives a fourth message sent by a first network device, where the fourth message is used to request the fourth network device to perform handover preparation to allow a terminal device to hand over to the fourth network device. The fourth message may be a new message, for example, a conditional handover request message. Alternatively, an existing message, for example, a handover request message or another message, is reused. The fourth message may include context information of the terminal device. Specifically, the context information of the terminal device may include at least one of a radio resource management configuration (radio resource management-config, RRM-config), radio access capability information, a security parameter, and a radio bearer configuration of the terminal device, and a system information block (system information block 1, SIB 1) of a source cell.

The first network device may be a network device to which a serving cell belongs, and the serving cell is a cell that currently accessed by the terminal device, and the fourth network device may be the network device to which the candidate target cell belongs. Further, the fourth network device may alternatively be a network device to which a first target cell belongs. This embodiment of this application is not limited thereto.

After receiving the fourth message, the fourth network device prepares for a conditional handover, for example, the fourth network device performs admission control, resource allocation/reservation, and the like. The fourth network device sends an acknowledgment message to the first network device, where the acknowledgment message is used to indicate that the fourth network device agrees to hand over the terminal device from the first network device to the fourth network device. The acknowledgment message may be a new message, for example, a conditional handover request acknowledgment message. Alternatively, an existing message, for example, a handover request acknowledgment message or another message, is reused. The acknowledgment message includes first configuration information.

After receiving the acknowledgment message sent by the fourth network device, the first network device sends conditional handover configuration information to the terminal device. The conditional handover configuration information includes the first configuration information.

It should be understood that in this embodiment of this application, the first configuration information includes all or a part of the conditional handover configuration information. Specifically, when the first configuration information includes all of the conditional handover configuration information, the first network device obtains the conditional handover configuration information from the acknowledgment message sent by the fourth network device, and transparently transmits the information to the terminal device. When the first configuration information includes a part of the conditional handover configuration information, the first network device obtains the part of information from the acknowledgment message sent by the fourth network device, generates the other part of the conditional handover configuration information, and sends the part of information and the other part of information to the terminal device.

Therefore, in this embodiment of this application, when the fourth network device agrees with a request of the first network device, the first network device may send the configuration information to the terminal device. Further, the terminal device determines the target cell based on the configuration information, and performs random access to the determined target cell, to complete a handover procedure, thereby improving a handover success rate.

It should be understood that in this embodiment of this application, the fourth network device may be a candidate target network device, or the fourth network device may be a network device to which the first target cell determined by the terminal device belongs. This embodiment of this application is not limited thereto.

It should be understood that the third aspect is performed by the fourth network device, and specific content of the third aspect corresponds to the content of the first aspect performed by the terminal device and the content of the second aspect performed by the first network device. For corresponding features of the third aspect and beneficial effects achieved by the third aspect, refer to the descriptions in the first aspect or the second aspect. To avoid repetition, detailed descriptions are appropriately omitted herein.

In a possible implementation, the acknowledgment message carries at least one of the following information: a cell identifier of the candidate target cell, frequency information of the candidate target cell, and a C-RNTI allocated by the candidate target cell to the terminal device, an identifier of a first beam that belongs to the candidate target cell, and a first random access channel RACH resource.

It should be understood that the acknowledgment message may further carry other information. For example, the acknowledgment message may further carry other information in the conditional handover configuration information. This embodiment of this application is not limited thereto.

In a possible implementation, when the fourth network device is the network device to which the first target cell belongs, the method further includes the following.

The fourth network device receives a first message sent by the terminal device, where the first message is used to notify the fourth network device of a successful handover of the terminal device, and the first message includes at least one of the following information: a cell radio network temporary identifier C-RNTI allocated by the serving cell to the terminal, a cell global identifier CGI of the serving cell, a physical cell identifier PCI of the serving cell, and a message authentication code for integrity MAC-I.

The fourth network device obtains the context information of the terminal device from the first network device based on the first message.

It should be understood that, when the fourth network device is the network device to which the first target cell belongs, the fourth network device is equivalent to the second network device in the foregoing description. This embodiment of this application is not limited thereto.

According to a fourth aspect, a communications apparatus is provided and includes each module or unit configured to perform the method in the first aspect or any possible implementation of the first aspect.

In an implementation, the communications apparatus is a terminal device.

According to a fifth aspect, a communications apparatus is provided and includes each module or unit configured to perform the method in the second aspect or any possible implementation of the second aspect.

In an implementation, the communications apparatus is a network-side device. Specifically, the communications apparatus may be a first network device to which a serving cell belongs.

According to a sixth aspect, a communications apparatus is provided and includes each module or unit configured to perform the method in the third aspect or any possible implementation of the third aspect.

In an implementation, the communications apparatus is a network-side device. Specifically, the communications apparatus may be a second network device to which a first target cell belongs.

According to a seventh aspect, a communications apparatus is provided, and includes a transceiver, a processor, and a memory. The processor is configured to control the transceiver to receive and send a signal, the memory is configured to store a computer program, and the processor is configured to invoke the computer program from the memory for running, so that the communications apparatus performs the method according to the first aspect or the possible implementations of the first aspect.

In an implementation, the communications apparatus is a terminal device.

According to an eighth aspect, a communications apparatus is provided, and includes a transceiver, a processor, and a memory. The processor is configured to control the transceiver to receive and send a signal, the memory is configured to store a computer program, and the processor is configured to invoke the computer program from the memory for running, so that the terminal device performs the method according to the second aspect or the possible implementations of the second aspect.

In an implementation, the communications apparatus is a network-side device. Specifically, the communications apparatus may be a first network device to which a serving cell belongs.

According to a ninth aspect, a communications apparatus is provided, and includes a transceiver, a processor, and a memory. The processor is configured to control the transceiver to receive and send a signal, the memory is configured to store a computer program, and the processor is configured to invoke the computer program from the memory for running, so that the terminal device performs the method according to the third aspect or the possible implementations of the third aspect.

In an implementation, the communications apparatus is a network-side device. Specifically, the communications apparatus may be a second network device to which a first target cell belongs.

According to a tenth aspect, a computer-readable medium is provided. The computer-readable medium stores a computer program, and when the computer program is executed by a computer, the method in the first aspect and the possible implementations of the first aspect is implemented.

According to an eleventh aspect, a computer-readable medium is provided. The computer-readable medium stores a computer program, and when the computer program is executed by a computer, the method in the second aspect and the possible implementations of the second aspect is implemented.

According to a twelfth aspect, a computer-readable medium is provided. The computer-readable medium stores a computer program, and when the computer program is executed by a computer, the method in the third aspect and the possible implementations of the third aspect is implemented.

According to a thirteenth aspect, a computer program product is provided. When the computer program product is executed by a computer, the method in the first aspect and the possible implementations of the first aspect is implemented.

According to a fourteenth aspect, a computer program product is provided. When the computer program product is executed by a computer, the method in the second aspect and the possible implementations of the second aspect is implemented.

According to a fifteenth aspect, a computer program product is provided. When the computer program product is executed by a computer, the method in the third aspect and the possible implementations of the third aspect is implemented.

According to a sixteenth aspect, a processing apparatus is provided, and includes a processor and an interface.

According to a seventeenth aspect, a processing apparatus is provided and includes a processor, an interface, and a memory.

In the sixteenth aspect or the seventeenth aspect, the processor is configured to perform the method in any one of the first aspect to the third aspect or the possible implementations of the first aspect to the third aspect. A related data exchange process (for example, sending or receiving data) is completed through the interface. In a specific implementation process, the interface may further complete the foregoing data exchange process by using the transceiver.

It should be understood that the processing apparatus in the sixteenth aspect or the seventeenth aspect may be a chip, and the processor may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in a memory. The memory may be integrated into the processor, or may be located outside the processor and exist independently.

According to an eighteenth aspect, a system is provided, and includes the terminal device, the first network device, and the second network device that are described above.

DETAILED DESCRIPTION OF ILLUSTRATIVE EMBODIMENTS

Figure 1:
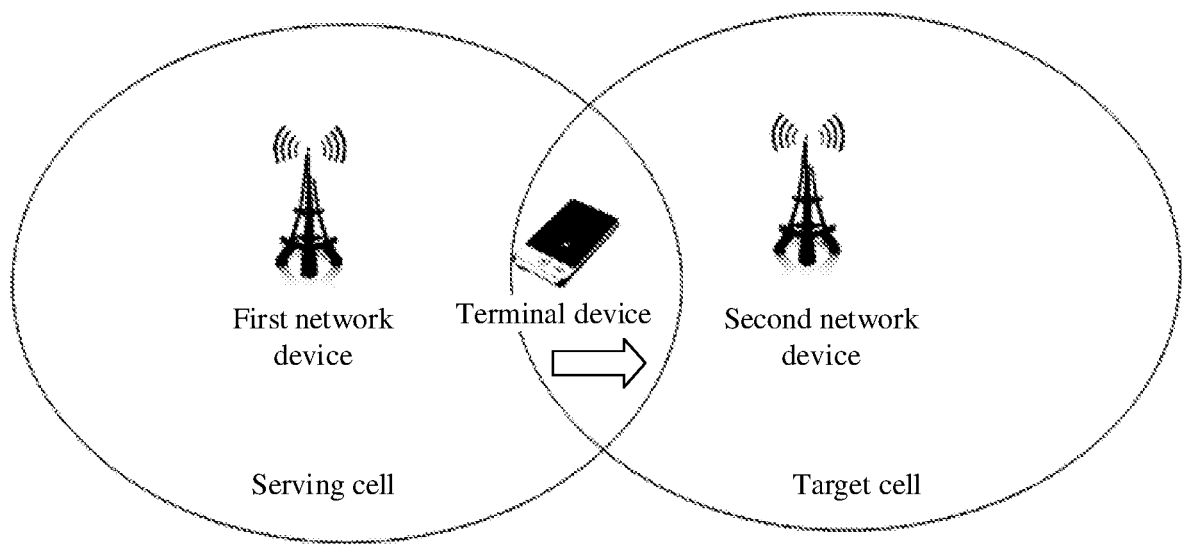
FIG. 1 is a schematic diagram of a scenario to which an embodiment of this application is applicable.

The following describes technical solutions of this application with reference to accompanying drawings.

The technical solutions of the embodiments of this application may be applied to various communications systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a 5th generation (5G) system, or a new radio (NR) system.

In the embodiments of this application, a terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, an unmanned aerial vehicle device, a terminal device in a future 5G network, or a terminal device in a future evolved public land mobile network (PLMN). This is not limited in the embodiments of this application.

In the embodiments of this application, a network device may also be referred to as an access network device. The network device may be a base transceiver station (BTS) in a global system for mobile communications (GSM) or a code division multiple access (CDMA) system, a NodeB (NB) in a wideband code division multiple access (WCDMA) system, an evolved NodeB (eNB or eNodeB) in an LTE system, a radio controller in a cloud radio access network (CRAN) scenario. Alternatively, the network device may be a relay station, an access point, a vehicle-mounted device, a wearable device, a network device in a future 5G network, or a network device in a future evolved PLMN network, for example, a transmission point (TRP or TP) in an NR system, a gNodeB (gNB) in an NR system, or one antenna panel or a group of antenna panels (including a plurality of antenna panels) of a base station in a 5G system. This is not particularly limited in the embodiments of this application.

A specific structure of an execution body of a method provided in the embodiments of this application is not specifically limited in the embodiments of this application provided that a program that records code for the method provided in the embodiments of this application can be run to perform communication according to the method provided in the embodiments of this application. For example, the execution body of the method provided in the embodiments of this application may be a terminal device, a network device, or a functional module that can invoke and execute a program in a terminal device or a network device.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD) or a digital versatile disc (DVD)), a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, include, and/or carry an instruction and/or data.

FIG. 1 is a schematic block diagram of a wireless communications system 100 to which an embodiment of this application is applicable. The wireless communications system 100 includes at least two cells, for example, a serving cell (which may also be referred to as a source cell) that belongs to a first network device 110 and a target cell that belongs to a second network device 120. When a terminal device 130 moves from the serving cell to the target cell, a handover may occur, that is, the terminal device 130 is handed over from the serving cell to the target cell.

It should be understood that the serving cell may also be referred to as a source cell, the target cell may be a neighboring cell of the serving cell, and at least one neighboring cell of the serving cell may be a candidate target cell. In other words, in this application, the target cell is one of the at least one neighboring cell of the serving cell, the neighboring cell of the serving cell may also be used as a candidate target cell, and the target cell is one of the candidate target cells. This embodiment of this application is not limited thereto.

It should be understood that "first", "second", "third", "fourth", and the like in the embodiments of this application are merely used for differentiation, and "first", "second", "third", and "fourth" are not intended to limit the embodiments of this application.

It should be understood that, in the embodiments of this application, one network device may have one or more cells. The serving cell and the target cell may also belong to a same network device, that is, the first network device and the second network device may be a same network device. In this case, the terminal device performs a handover within the network device.

Optionally, the serving cell and the target cell may also belong to different network devices, that is, the first network device and the second network device may be different network devices. In this case, the terminal device performs a handover between the network devices.

As shown in FIG. 1, in an existing solution, mobility management of the terminal device 130 in connected mode is controlled by the first network device 110. In other words, the first network device controls, by sending a handover message, the terminal device to hand over to the target cell. Therefore, whether the handover message can be successfully sent depends strongly on serving link quality of the source cell. If the serving link quality is poor, the handover message may fail to be sent, resulting in a low handover success rate. It may be understood that the handover message herein is an RRC message. For example, the RRC message may be an RRC reconfiguration message carrying a synchronization reconfiguration (ReconfigurationWithSync) information element, or may be an RRC connection reconfiguration message carrying a mobility control information (mobility control info) information element, or may have another name. The name of the message is not limited in the embodiments of this application.

In view of the foregoing problem, the embodiments of this application provide a communication method, which can improve a handover success rate.

In the embodiments of this application, when signal quality of a serving cell deteriorates, a terminal device may determine a target cell. Compared with the current technology in which when signal quality of a current serving cell deteriorates, a network device sends a handover message to indicate, to a terminal device, a target cell to which the terminal device needs to be handed over, the embodiments of this application can ensure a success rate of sending conditional handover configuration information when a first network device sends the conditional handover configuration information to the terminal device, for example, the first network device sends the conditional handover configuration information to the terminal device when link communication quality is relatively good. Further, the terminal device determines, based on the configuration information, how to perform a handover, thereby improving a handover success rate.

It should be understood that, an occasion for sending the conditional handover configuration information is not limited in the embodiments of this application. The network device may send the conditional handover configuration information at any time. For example, the network device may send the conditional handover configuration information when the signal quality of the serving cell is relatively good, or may send the conditional handover configuration information when the signal quality of the serving cell is relatively poor.

For ease of understanding and description, as an example rather than a limitation, the following describes an execution process and actions of the communication method in the communications system in this application.

Figure 2:
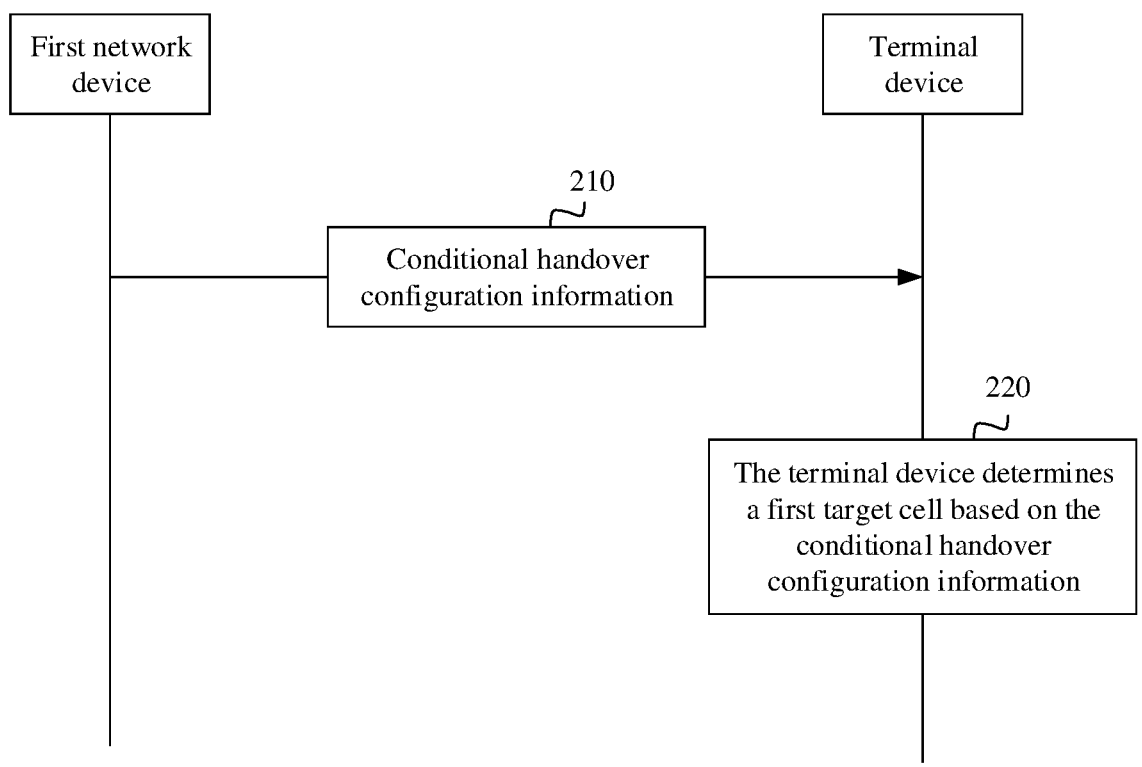
FIG. 2 is a schematic flowchart of a communication method according to an embodiment of this application.

FIG. 2 is a schematic flowchart of a communication method according to this application. The method shown in FIG. 2 may be applied to the foregoing communications system. The method 200 shown in FIG. 2 includes the following steps.

210. A first network device sends conditional handover configuration information to a terminal device.

Correspondingly, the terminal device receives the configuration information.

It should be understood that, in this embodiment of this application, "conditional handover" means that a handover performed by the terminal device needs to satisfy a specific condition. The condition may be referred to as a trigger condition of the handover performed by the terminal device. The conditional handover configuration information may be used to configure the trigger condition. The terminal device may determine, based on cell signal quality of a serving cell and cell signal quality of a neighboring cell (or a candidate target cell), whether the trigger condition of the conditional handover is satisfied. If the trigger condition is satisfied, the terminal device performs the handover.

Specifically, in this embodiment of this application, the first network device may be a network device to which a serving cell belongs, and the serving cell is a cell that currently accessed by the terminal device.

It should be understood that, in this embodiment of this application, the configuration information may be carried in a radio resource control (RRC) message. For example, the RRC message may be an RRC reconfiguration message carrying a synchronization reconfiguration (ReconfigurationWithSync) information element or an RRC connection reconfiguration message carrying a mobility control information (mobility control info) information element, or may be another message or a newly defined RRC message, for example, an RRC conditional reconfiguration message, or may have another name. This is not limited in this application. The configuration information may also be another message, for example, may be a media access control (MAC) message or a downlink control information (DCI) message. This embodiment of this application is not limited thereto.

220. The terminal device determines a first target cell based on the configuration information.

For example, the first target cell is a candidate target cell that satisfies the trigger condition of the handover. That is, the first target cell is a candidate target cell and satisfies the trigger condition of the handover.

It should be understood that, in this embodiment of this application, the candidate target cell is a neighboring cell of the serving cell currently accessed by the terminal device. In an implementation, the candidate target cell may include all neighboring cells served by the serving cell. In this case, the neighboring cell and the candidate target cell may be used interchangeably. The neighboring cell mentioned in this specification can be replaced with the candidate target cell, or the candidate target cell mentioned in this specification can be replaced with the neighboring cell. In another implementation, the candidate target cell may include some neighboring cells served by the serving cell. In this case, the neighboring cell is different from the candidate target cell, the neighboring cell and the candidate target cell cannot be used interchangeably, and a range of the neighboring cell is greater than a range of the candidate target cell. This embodiment of this application is not limited thereto. Specifically, whether the neighboring cell and the candidate target cell may be used interchangeably is described in detail below, and details are not described herein. Optionally, after the terminal device determines the first target cell that satisfies the trigger condition, the method may further include: The terminal device performs a handover, that is, the terminal device is handed over from the serving cell to the first target cell. For example, the terminal device performs random access to the first target cell, to be handed over to the first target cell.

It should be understood that the first target cell may be a neighboring cell of the serving cell. In this embodiment of this application, one network device may serve a plurality of cells. The handover in this embodiment of this application may be a handover in the serving cell, may be a handover between a plurality of cells served by one network device, or may be a cell handover between different network devices. This embodiment of this application is not limited thereto.

For example, the serving cell and the first target cell may be a same cell. In this case, the handover is an intra-cell handover. For example, to change a key, the terminal device may perform an intra-cell handover. In an intra-cell handover scenario, the first network device to which the serving cell belongs and a second network device to which the first target cell belongs are a same network device. Optionally, the serving cell and the first target cell may be different cells. In an implementation, the serving cell and the first target cell may be different cells served by a same network device. Alternatively, in another implementation, the serving cell and the first target cell may be different cells served by different network devices. This embodiment of this application is not limited thereto.

In a possible implementation, in this embodiment of this application, when the signal quality of the serving cell deteriorates, the terminal device may determine the target cell based on the configuration information sent by the first network device. This embodiment of this application can ensure a success rate of sending the configuration information when the first network device sends the configuration information to the terminal device, for example, the first network device sends the configuration information to the terminal device when link communication quality is relatively good. Further, the terminal device determines the target cell based on the configuration information, and performs random access to the determined target cell, to complete a handover procedure, thereby improving a handover success rate.

Optionally, the configuration information is used to configure a first measurement object and a handover condition threshold, where a measurement result of the first measurement object and the handover condition threshold are used to determine whether a trigger condition of a conditional handover is satisfied.

In step 220, that the terminal device determines a first target cell based on the configuration information includes:

The terminal device determines a candidate target cell that satisfies the trigger condition as the first target cell based on the measurement result of the first measurement object and the handover condition threshold.

Specifically, after obtaining the configuration information, the terminal device measures the first measurement object. If a measurement result of a candidate target cell corresponding to the measurement object satisfies the trigger condition of the handover, the terminal device may determine the candidate target cell as the first target cell. After determining the first target cell, the terminal device may perform a handover, that is, is handed over from the serving cell to the first target cell.

It should be understood that when a plurality of candidate target cells all satisfy the trigger condition, the terminal device may select one of the candidate target cells as the first target cell. Specifically, the terminal device may randomly select one of the candidate target cells as the first target cell, or the terminal device may select, according to a rule, the first target cell from the plurality of candidate target cells that satisfy the trigger condition. This is not limited in this embodiment of this application.

In this embodiment of this application, the measurement object may be frequency information, for example, may be a frequency. Specifically, the frequency includes an SSB frequency (for example, absoluteFrequencySSB) and/or an absolute frequency position (for example, absoluteFrequencyPointA) of a reference resource block (common RBo). This application is not limited thereto. The first measurement object may be a frequency. The terminal device may measure signal quality of a plurality of candidate target cells corresponding to the frequency. When measured signal quality of a candidate target cell satisfies the trigger condition of the handover, the terminal device may determine the candidate target cell as the first target cell.

It should be understood that, in this embodiment of this application, the handover condition threshold may include one threshold or may include a plurality of thresholds. A quantity of thresholds included in the handover condition threshold and values of the thresholds may vary with different events. Correspondingly, a criterion for determining whether the trigger condition is satisfied also changes adaptively. An example is used for description below.

Optionally, the handover condition threshold may include a first signal quality threshold. When a difference between the signal quality of the candidate target cell and the signal quality of the serving cell is greater than or equal to the first signal quality threshold, the candidate target cell satisfies the trigger condition. In other words, when the signal quality of the candidate target cell is greater than or equal to a sum of the signal quality of the serving cell and the first signal quality threshold, the candidate target cell satisfies the trigger condition. Alternatively, the handover condition threshold may include a second signal quality threshold and a third signal quality threshold. When the signal quality of the candidate target cell is greater than or equal to the third signal quality threshold, and the signal quality of the serving cell is less than the second signal quality threshold, the candidate target cell satisfies the trigger condition, where the third signal quality threshold is greater than or equal to the second signal quality threshold.

It should be understood that the configuration information may include the first measurement object and the handover condition threshold, or may not include the first measurement object or the handover condition threshold, but includes other information used to determine the first measurement object and the handover condition threshold. Specifically, for whether the configuration information specifically includes the first measurement object and the handover condition threshold or includes other information used to determine the first measurement object and the handover condition threshold, refer to descriptions in embodiments in FIG. 3 to FIG. 5. Details are not described herein.

It should be noted that the configuration information may further include other related information used for the handover. As an example rather than a limitation, specific implementations of the information included in this embodiment of this application are briefly listed below. It should be understood that, in an actual application, the configuration information may include information in one or more of the following implementations. This embodiment of this application is not limited thereto.

Optionally, in an implementation, the configuration information may further include at least one of the following information: a cell identifier of the candidate target cell, frequency information of the candidate target cell, a C-RNTI allocated by the candidate target cell to the terminal device, an identifier of a first beam that belongs to the candidate target cell, and a first random access channel RACH resource.

Specifically, the cell identifier includes a PCI and/or a CGI. The frequency information includes an SSB frequency (for example, absoluteFrequencySSB) of the candidate target cell and/or an absolute frequency position (for example, absoluteFrequencyPointA) of a reference resource block (common RBo) of the candidate target cell. The identifier of the first beam includes an SSB index and/or a CSI-RS index. The first random access channel RACH resource includes a first dedicated random access resource and/or a first common random access resource. The first dedicated random access resource is associated with the first beam, the first dedicated random access resource includes a first preamble index and a first time-frequency resource, and the first common random access resource includes a second time-frequency resource.

It should be understood that in various embodiments of this application, a beam may be understood as a spatial resource, and may be a transmit or receive precoding vector having energy transmission directivity. In addition, the transmit or receive precoding vector can be identified by using index information. The index information may be corresponding to an identity (ID) of a configured resource of the terminal. For example, the index information may be corresponding to an identity or a resource of a configured SSB, or may be corresponding to an identity or a resource of a configured CSI-RS, or may be corresponding to an identity or a resource of a configured uplink sounding reference signal (SRS). Optionally, the index information may also be explicitly or implicitly carried by a signal or a channel that is carried by a beam. The energy transmission directivity may mean that the precoding vector is used to perform precoding processing on a signal that needs to be sent, so that the signal obtained after the precoding processing has specific spatial directivity, and that a received signal obtained after the precoding processing is performed by using the precoding vector has relatively good received power, for example, satisfies a received demodulation signal-to-noise ratio. The energy transmission directivity may also mean that same signals sent from different spatial positions and received by using the precoding vector have different received power. Optionally, a same communications apparatus (for example, a terminal device or a network device) may have different precoding vectors, and different devices may also have different precoding vectors, that is, correspond to different beams. For a configuration or a capability of a communications apparatus, one communications apparatus may simultaneously use one or more of a plurality of different precoding vectors, that is, one or more beams may be simultaneously formed.

Optionally, in an implementation, the handover condition threshold corresponds to a quality level, and the quality level is used to indicate a quality value range of the serving cell.

Specifically, a plurality of handover condition thresholds may be configured by using the configuration information. In a possible implementation, different handover condition thresholds correspond to different quality levels, and the quality level is used to indicate a quality value range of the serving cell. Alternatively, in another possible implementation, different quality levels may correspond to one of the plurality of handover condition thresholds, and the quality level is used to indicate a quality value range of the serving cell. Alternatively, in another possible implementation, a same quality level may correspond to at least two of the plurality of handover condition thresholds, and the quality level is used to indicate a quality value range of the serving cell.

In other words, in this embodiment of this application, a plurality of handover condition thresholds may be configured by using the configuration information. The terminal device may select a corresponding handover condition threshold based on a quality level of the serving cell (or a quality value range of the serving cell), to search for the target cell.

Therefore, in this embodiment of this application, the terminal device can use a corresponding handover condition threshold based on a quality status of the serving cell, to properly and flexibly determine the target cell.

Optionally, in an implementation, the configuration information includes time to trigger (TTT) indication information, and the TTT indication information is used to indicate whether the terminal device uses a TTT mechanism to determine the first target cell.

If the TTT indication information indicates that the TTT mechanism does not need to be used, once the terminal device determines that the trigger condition is satisfied, the terminal device is handed over to the target cell that satisfies the trigger condition. If the TTT indication information indicates that the TTT mechanism needs to be used, and the candidate target cell always satisfies the trigger condition only when within a time to trigger (TTT) configured by a network, the terminal device determines the candidate target cell as the first target cell. After the time to trigger is reached, the terminal device is handed over to the first target cell that satisfies the trigger condition. It should be understood that a timing start time of the TTT may be a start time at which the candidate target cell satisfies the trigger condition. The candidate target cell is determined as the first target cell only when the candidate target cell continuously satisfies the trigger condition within the TTT.

In this embodiment of this application, the configuration information carries the TTT indication information, to flexibly indicate whether the terminal device needs to use the TTT mechanism. If the TTT indication information indicates that the TTT mechanism does not need to be used, the terminal device may be quickly handed over to the target cell that satisfies the trigger condition. If the TTT indication information indicates that the TTT mechanism needs to be used, the handover is performed only when the candidate target cell always satisfies the trigger condition within a period of time (that is, the time to trigger). This can ensure that the handover is performed when network quality is relatively good and relatively stable. Therefore, service stability can be ensured, and network performance can be improved.

Optionally, in an implementation, the configuration information includes report-free indication information, and the report-free indication information is used to indicate the terminal device to directly perform random access to the first target cell after determining the first target cell that satisfies the trigger condition, with no need to send a measurement report to the first network device. Alternatively, in an implementation, the configuration information may not include the report-free indication information. In this case, in this embodiment of this application, the terminal device may be implicitly indicated not to report the measurement report. For example, it is stipulated, according to a preset rule or a protocol, that after the receiving the configuration information sent by the first network device, the terminal device does not need to report the measurement report after a handover condition is triggered, but is handed over to the target cell that satisfies the trigger condition.

In this embodiment of this application, the report-free indication information is carried in the configuration information. After determining the first target cell, the terminal device does not need to send the measurement report, so that signaling overheads can be reduced, and a fast handover can be implemented.

Optionally, in an implementation, the configuration information includes a fourth signal quality threshold. That the terminal device determines a first target cell based on the configuration information includes: The terminal device determines the first target cell based on the configuration information when the signal quality of the serving cell is less than the fourth signal quality threshold. For example, the terminal device searches for, based on content included in the configuration information, the first target cell that satisfies the trigger condition.

In other words, in this implementation, when the signal quality of the serving cell is relatively good, for example, is greater than or equal to the fourth signal quality threshold, the terminal device may not need to search for the target cell. When the signal quality of the serving cell is relatively poor, for example, is less than the fourth signal quality threshold, the terminal device may search for, based on the configuration information, the target cell that satisfies the trigger condition.

Therefore, in this embodiment of this application, an unnecessary handover process performed when the signal quality of the serving cell is relatively good is avoided.

Optionally, in an implementation, the configuration information is further used to configure a handover cancellation condition. The method further includes: In a process in which the terminal device performs the random access to the first target cell, if the handover cancellation condition is satisfied, the terminal device cancels the random access process, and continues to communicate with the serving cell.

Optionally, in an implementation, the configuration information is further used to configure a handover cancellation condition. The method further includes: In a process in which the terminal device searches for the first target cell that satisfies the trigger condition, if the handover cancellation condition is satisfied, the terminal device cancels the searching process, and continues to communicate with the serving cell.

For example, the configuration information includes a cancellation condition, where whether the handover cancellation condition is satisfied is determined based on the cancellation condition and the signal quality of the serving cell and/or the signal quality of the candidate target cell.

For example, after the receiving the configuration information, the terminal device may determine, based on link quality, whether to cancel the handover. For example, when the quality of the serving cell becomes better, the terminal device may cancel the handover and continue to communicate with the serving cell. That is, in this case, when the quality of the serving cell is higher than or equal to a quality threshold, the cancellation condition is satisfied.

In this embodiment of this application, when the signal quality of the serving cell becomes better, because the signal quality of the serving cell is relatively good, normal running of services can also be ensured with no need to perform the handover. Therefore, in this embodiment of this application, when the signal quality of the serving cell is relatively good, the process of searching for the target cell is canceled, to avoid an unnecessary target-cell determining process, reduce energy consumption of the terminal device, and reduce implementation complexity of the terminal device.

It should be noted that examples of corresponding content included in the configuration information are merely briefly described above. In an actual application, the configuration information may have a plurality of forms. Specific content of the configuration information and a specific handover method of the terminal device in this embodiment of this application are separately described in detail below with reference to specific examples in FIG. 3 to FIG. 8.

It should be understood that the configuration information in this specification may be delivered by using one message or by using different messages. This embodiment of this application is not limited thereto.

Figure 3:
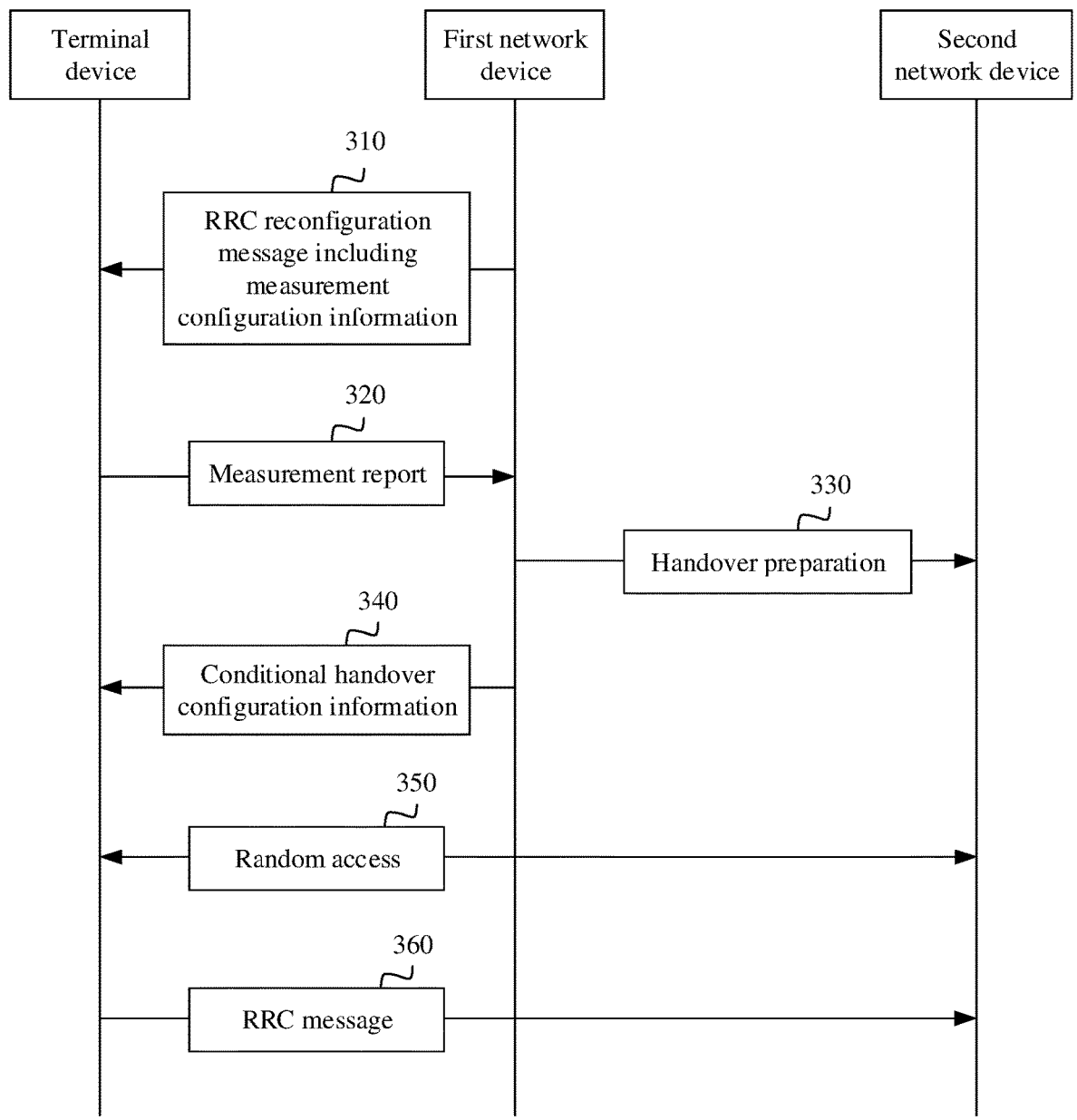
FIG. 3 is a schematic flowchart of a handover method according to an embodiment of this application.
Figure 4:
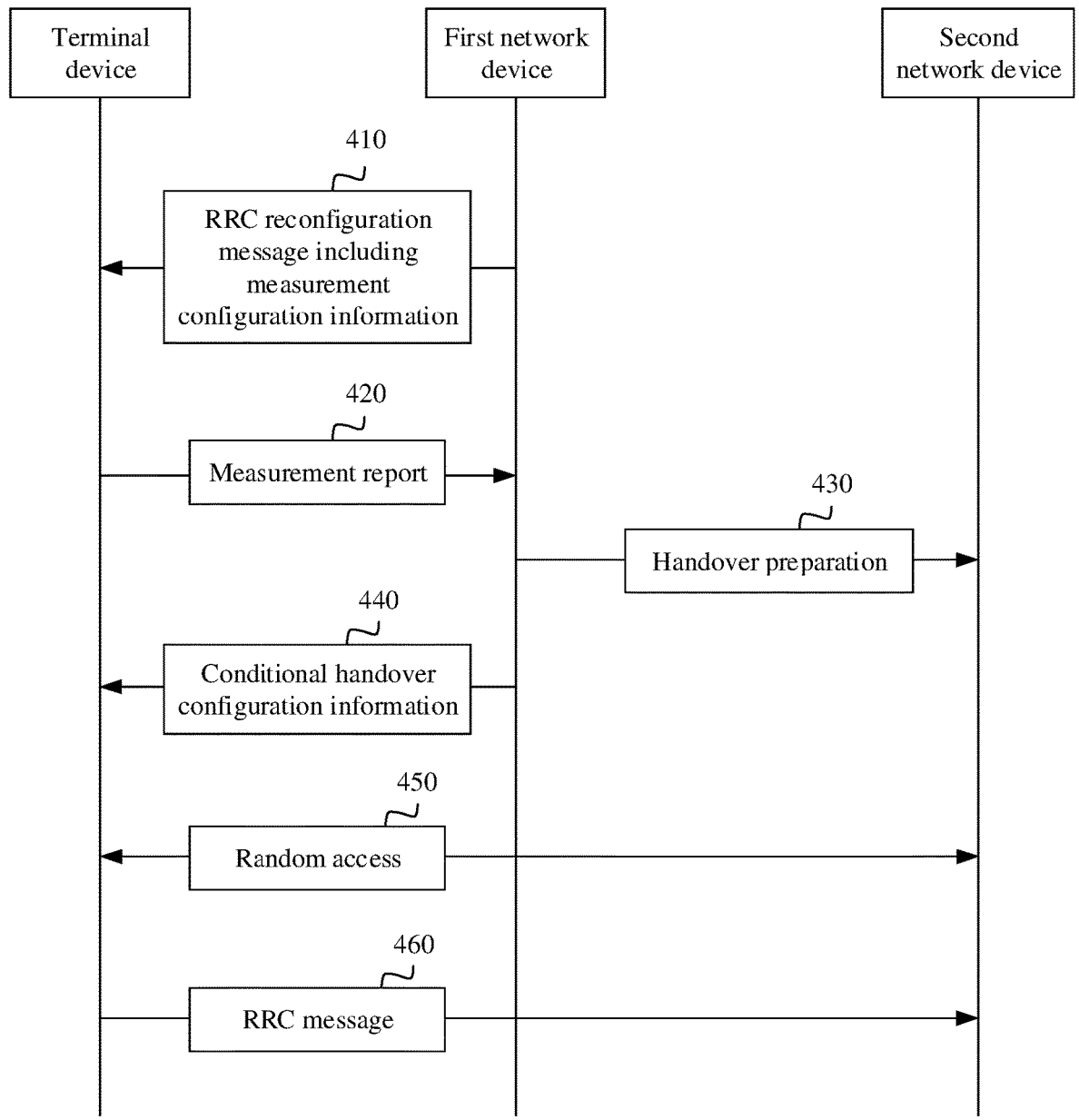
FIG. 4 is a schematic flowchart of a handover method according to another embodiment of this application.
Figure 5:
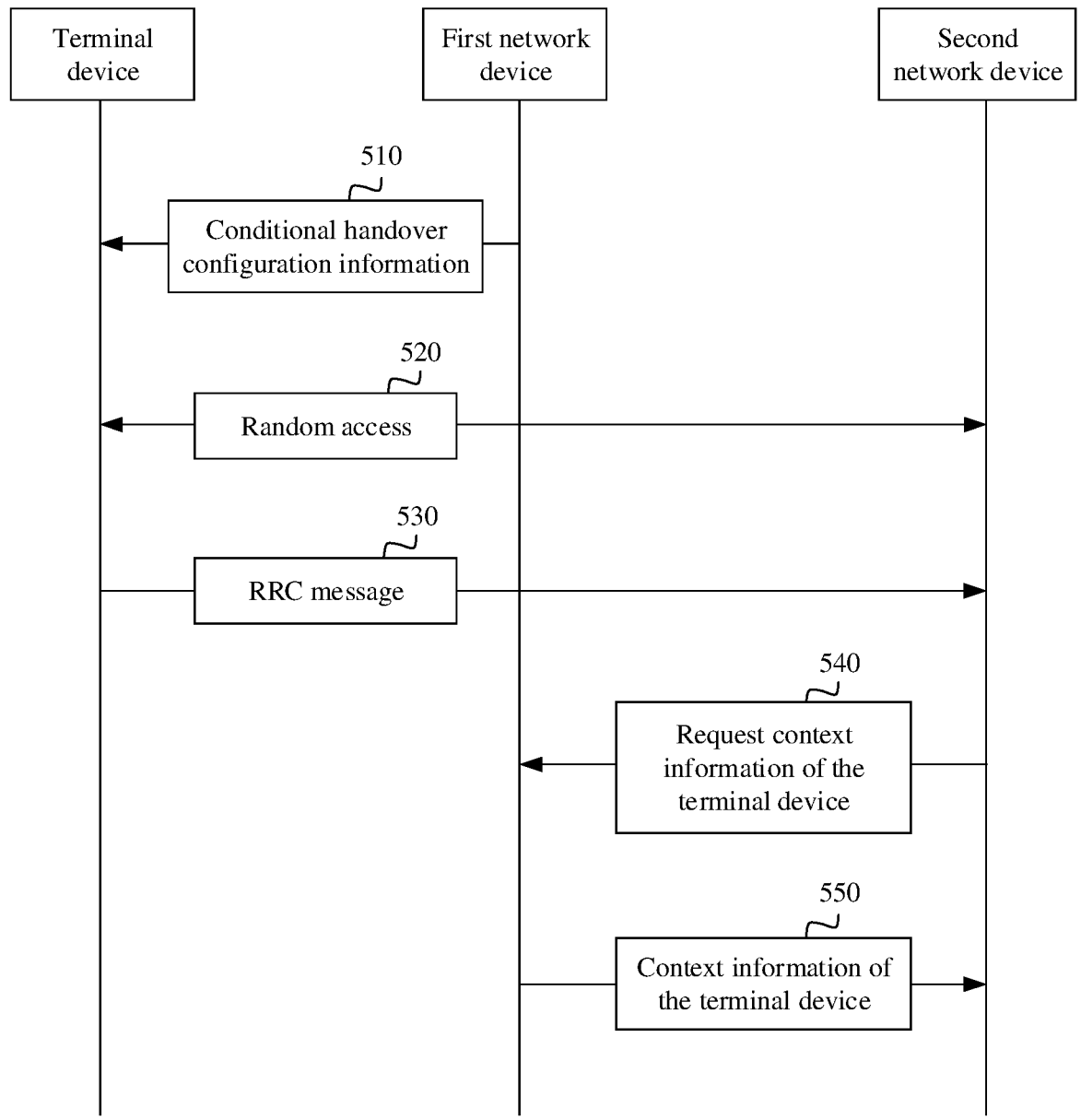
FIG. 5 is a schematic flowchart of a handover method according to another embodiment of this application.
Figure 6:
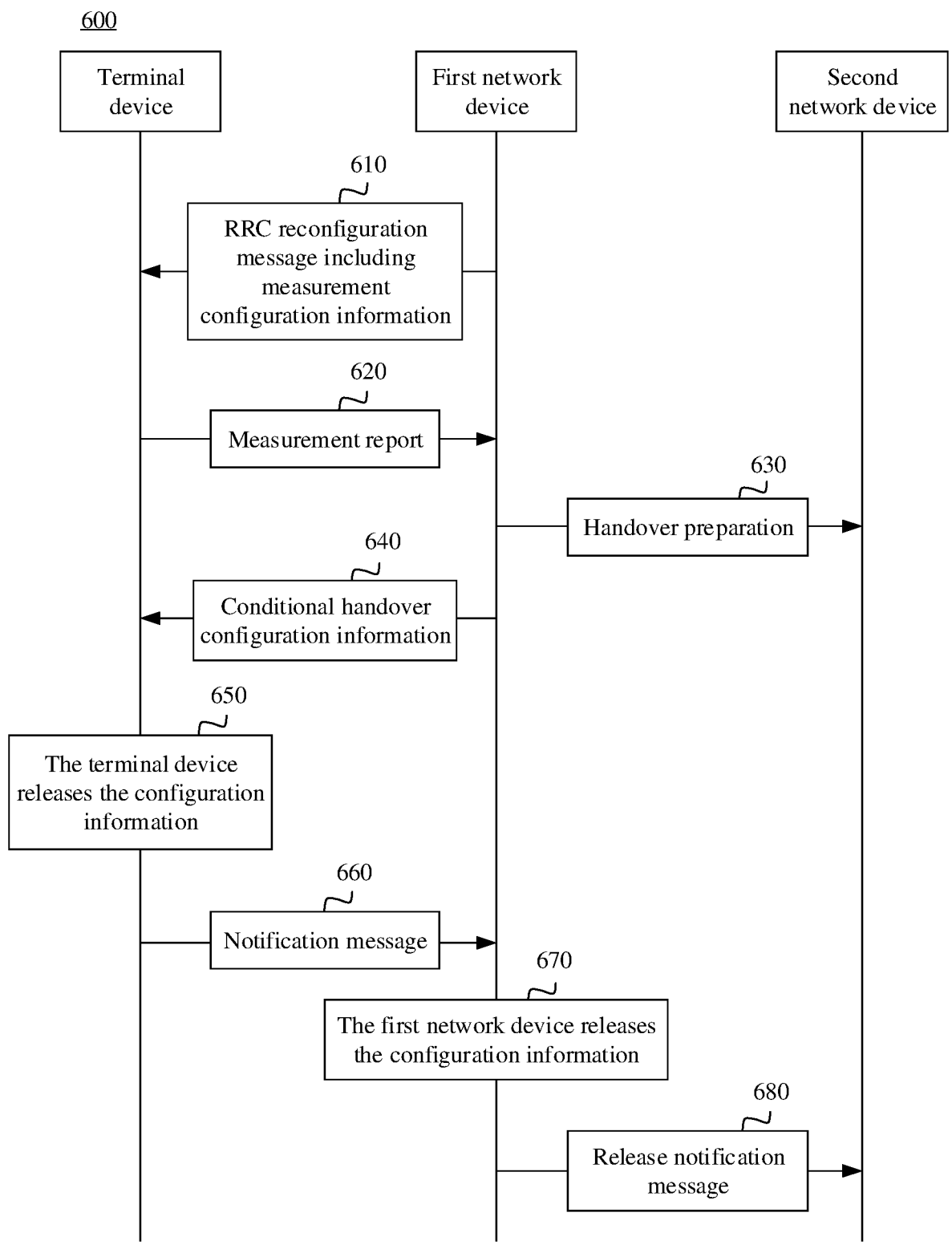
FIG. 6 is a schematic flowchart of a handover method according to another embodiment of this application.
Figure 7:
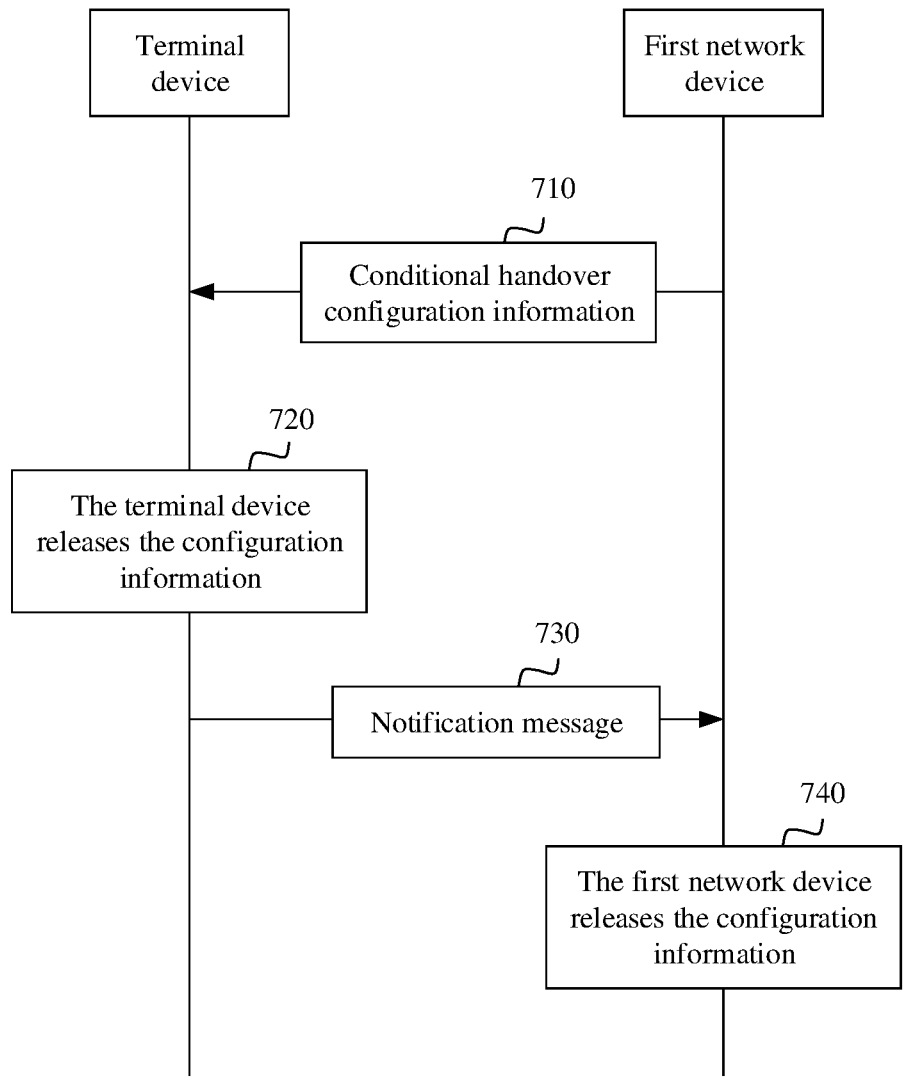
FIG. 7 is a schematic flowchart of a handover method according to another embodiment of this application.
Figure 8:
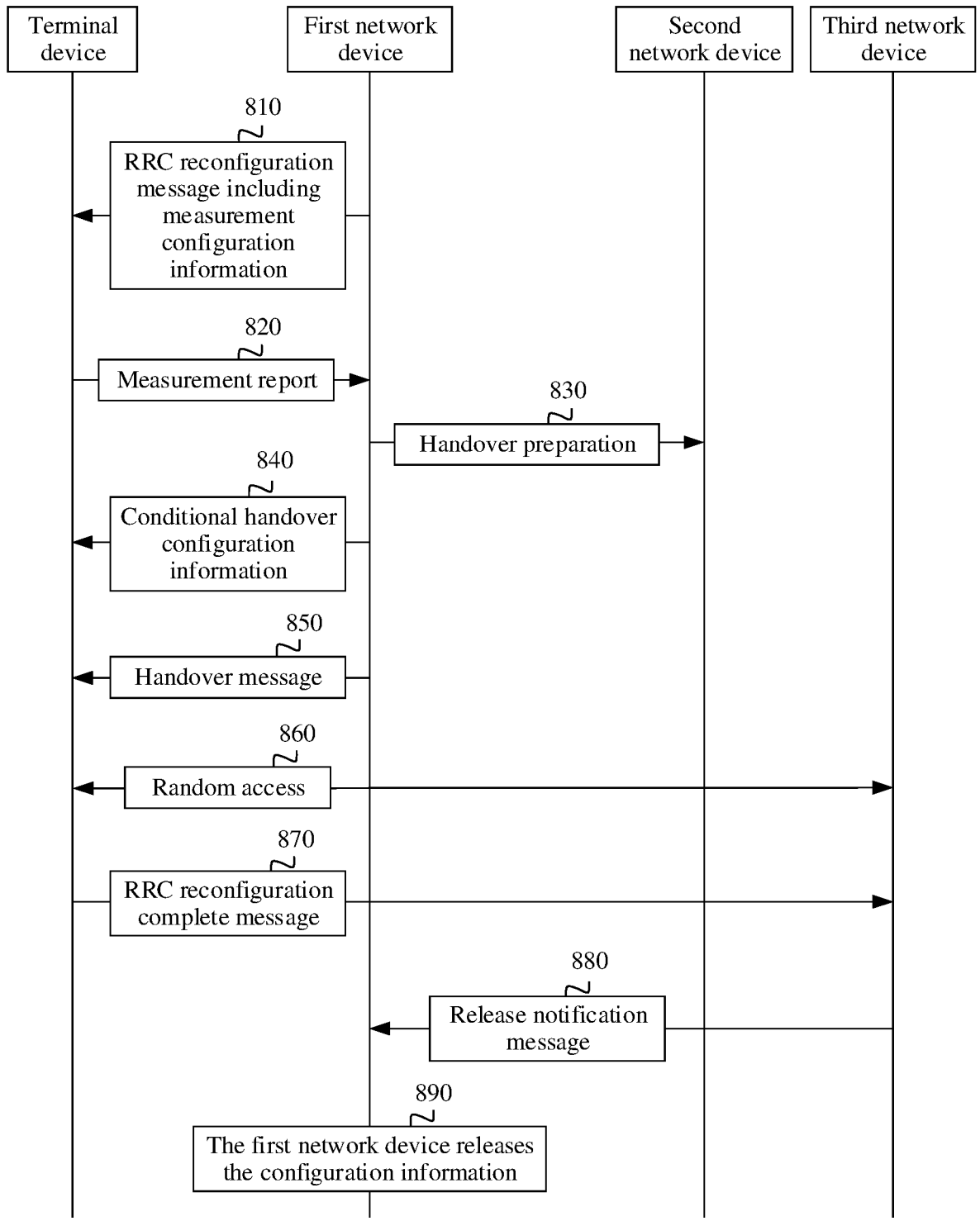
FIG. 8 is a schematic flowchart of a handover method according to another embodiment of this application.

Optionally, as shown in FIG. 3 or FIG. 4, before a network device sends conditional handover configuration information, the network device may further send measurement configuration information to a terminal device. As shown in FIG. 3, the conditional handover configuration information may be associated with the measurement configuration information. Alternatively, as shown in FIG. 4, the conditional handover configuration information may not be associated with the measurement configuration information. Alternatively, as shown in FIG. 5, a network device sends a piece of signaling, for example, an RRC message. The signaling may include the measurement configuration information shown in FIG. 3 or FIG. 4, and may further include content included in the conditional handover configuration information shown in FIG. 3 or FIG. 4. Further, as shown in FIG. 6 and based on FIG. 3 or FIG. 4, or as shown in FIG. 7 and based on FIG. 5, the conditional handover configuration information or the RRC message may be further used to configure a handover cancellation condition. In this case, the terminal device may determine, based on a link status, whether to cancel a process of determining a first target cell. Further, as shown in FIG. 8 and based on FIG. 3, FIG. 4, or FIG. 5, in a process in which the terminal device searches for the first target cell, the terminal device may further receive a handover message that is sent by the first network device and that is used to indicate the terminal device to hand over to a second target cell. In this case, the terminal device may perform a handover flexibly based on the handover message. Detailed descriptions are provided below with reference to examples of corresponding accompanying drawings.

It should be understood that, for ease of description, "conditional handover configuration information" is briefly described as "configuration information" in some parts of the embodiments of this application. In other words, unless otherwise specified or limited, "configuration information"

in the embodiments of this application is equivalent to "conditional handover configuration information". It should be noted that "configuration information" and "measurement configuration information" in the embodiments of this application are two different pieces of information. For a specific difference, refer to the following descriptions. Details are not described herein.

As shown in FIG. 3, before the network device sends the conditional handover configuration information, the network device may further send the measurement configuration information to the terminal device. The conditional handover configuration information may be associated with the measurement configuration information. That is, the embodiments provide a method for configuring a conditional handover. In the method, the network device provides the conditional handover configuration information based on the measurement configuration information, that is, the conditional handover configuration information is attached to the measurement configuration information. Specifically, with reference to FIG. 3, a handover method in an embodiment of this application is described in detail below. The method 300 shown in FIG. 3 includes the following steps.

310. A first network device sends an RRC reconfiguration message including measurement configuration information to a terminal device.

Correspondingly, the terminal device receives the RRC reconfiguration message that is sent by the first network device and that includes the measurement configuration information. The measurement configuration information includes at least one measurement identifier and a measurement object and a reporting configuration that are associated with each measurement identifier, and the reporting configuration is used to configure a reporting event and a reporting condition threshold corresponding to the reporting event.

Specifically, the reporting configuration may include a type of an event, a threshold corresponding to the event, and the like. For example, the first network device (for example, a network device to which a serving cell belongs, and the serving cell is a cell that currently accessed by the terminal) sends the measurement configuration information to the terminal device. The measurement configuration information includes a measurement identifier (measID), a measurement object (measObject), and a reporting configuration (ReportConfig). The measurement object may be a frequency or a frequency band. This embodiment of this application is not limited thereto.

The reporting configuration mainly includes a reporting type (for example, periodic reporting or event-triggered reporting) of a measurement report, an event trigger configuration, a periodic reporting configuration, and the like. Specifically, the event trigger configuration may include an event type (for example, A1 to A6) of the reporting event, a related configuration (for example, may include a threshold (for example, the reporting condition threshold corresponding to the reporting event), a hysteresis value, and a TTT) corresponding to the event, a reference signal type, a reporting interval, a quantity of reporting times, and the like. The periodic reporting configuration may include a reference signal type, a reporting interval, a quantity of reporting times, a maximum quantity of reported cells, and the like.

The measurement identifier may associate the measurement object with the reporting configuration. That is, a measurement identifier may indicate a measurement object and a reporting configuration that are associated with the measurement identifier. For example, the measurement configuration information may include content in the following Table 1. To be specific, the measurement configuration includes a measurement identifier 1 and a first frequency and a first reporting configuration that are associated with the measurement identifier 1, a measurement identifier 2 and a second frequency and a second reporting configuration that are associated with the measurement identifier 2, and a measurement identifier 3 and a third frequency and a third reporting configuration that are associated with the measurement identifier 3. It should be understood that measurement objects associated with different measurement identifiers may be the same or different. For example, the first frequency may be the same as or different from the second frequency. Reporting configurations associated with different measurement objects may also be the same or different. For example, the second reporting configuration and the third reporting configuration are the same or different. It should be understood that measurement objects and reporting configurations associated with two different measurement identifiers are not completely the same. For example, the first frequency is the same as the second frequency, and the first reporting configuration is different from the second reporting configuration. Alternatively, the first frequency is different from the second frequency, and the first reporting configuration is the same as the second reporting configuration. Alternatively, the first frequency is different from the second frequency, and the first reporting configuration is different from the second reporting configuration.

TABLE 1

| Measurement identifier | Measurement object | Reporting configuration |
| --- | --- | --- |
| 1 | First frequency | First reporting configuration |
| 2 | Second frequency | Second reporting configuration |
| 3 | Third frequency | Third reporting configuration |

320. The terminal device sends a measurement report to the first network device.

Specifically, after a trigger condition of an event in a reporting configuration associated with a measurement object is satisfied, the terminal device sends the measurement report to the first network device. The measurement report includes an identifier of a neighboring cell that satisfies the trigger condition of the event and a measurement result of the neighboring cell. The measurement report further includes an identifier of a beam belonging to the neighboring cell, and optionally further includes a measurement result of the beam belonging to the neighboring cell. The identifier of the neighboring cell includes a PCI and/or a CGI, the identifier of the beam includes an SSB index and/or a CSI-RS index, and the measurement result includes reference signal received power and/or reference signal received quality.

For example, an event type of a reporting event configured in the reporting configuration is an event A3, and a corresponding threshold is a first reporting condition threshold (for example, an offset (dB)). If a trigger condition of the event A3 is satisfied, it indicates that a difference between signal quality of the neighboring cell and signal quality of the serving cell is greater than the first reporting condition threshold. To be specific, when the difference between the signal quality of the neighboring cell corresponding to the measurement object and the signal quality of the serving cell is greater than the first reporting condition threshold, the terminal device sends the measurement report to the first network device.

For another example, an event type of a reporting event configured in the reporting configuration is an event A5, and corresponding thresholds are a second reporting condition threshold (for example, a first threshold (threshold 1)) and a third reporting condition threshold (for example, a second threshold (threshold 2)). If a trigger condition of the event A5 is satisfied, it indicates that signal quality of the neighboring cell is greater than the threshold 2 and signal quality of the serving cell is less than the threshold 1. To be specific, when the signal quality of the neighboring cell corresponding to the measurement object is greater than the threshold 2, and the signal quality of the serving cell corresponding to the measurement object is less than the threshold 1, the terminal device sends the measurement report to the first network device.

It should be noted that, in an existing solution, a terminal device may also send a measurement report to a network device. In this embodiment of this application, a value of a threshold may be adjusted. For example, in this embodiment of this application, for the event A3, an offset value may be changed, for example, the offset value is reduced. For example, an existing offset value is 3 dB. To be specific, when quality of a neighboring cell is greater than or equal to quality of a serving cell plus 3 dB, the terminal device sends the measurement report to the network device. In this embodiment of this application, the network device may configure a relatively low offset value in the measurement configuration information. For example, the offset value configured by the network device may be 1 dB. In this case, because the quality of the serving cell is relatively good, the offset is reduced. That is, when the link quality of the serving cell is fairly good, for example, when the quality of the neighboring cell is greater than or equal to the quality of the serving cell plus 1 dB, the terminal device reports the measurement report to the network device. Compared with the current technology in which the terminal device sends the measurement report only when the quality of the serving cell is relatively poor, this embodiment of this application can enable the terminal device to report the measurement result to the first network device as soon as possible, to improve a reporting success rate of the terminal device, and can enable the first network device to perform handover preparation with a candidate target network device as soon as possible based on the measurement report.

In other words, in this embodiment of this application, the terminal device may be triggered relatively early to send the measurement report. In other words, when the signal quality of the serving cell is relatively good, the terminal device may be triggered to send the measurement report.

It should be understood that in this embodiment of this application, after the trigger condition of the event in the reporting configuration associated with the measurement object is satisfied, the terminal device may send the measurement report once. Optionally, the terminal device may alternatively periodically send the measurement report. For example, after the terminal device determines that the trigger condition of the event in the reporting configuration associated with the measurement object is satisfied, the terminal device sends the measurement report, and the terminal device sends the measurement report again at an interval of a specific period of time. This embodiment of this application is not limited thereto. In an actual application, in step 320, the network device may receive a plurality of measurement reports from one terminal device within a period of time. This embodiment of this application is not limited thereto.

330. The first network device performs handover preparation with the candidate target network device.

Specifically, the first network device uses, based on measurement information of the neighboring cell included in the measurement report, the neighboring cell included in the measurement report as a candidate target cell, and determines the candidate target network device based on the candidate target cell. The candidate target network device is a network device to which the candidate target cell belongs. The candidate target network device includes one or more network devices. In this embodiment of this application, the candidate target network device may also be referred to as a fourth network device. It should be understood that a second network device in this specification is one of the one or more network devices included by the candidate target network device. In other words, the second network device may be a network device to which a first target cell belongs, and the second network device is a network device in the candidate target network device. Optionally, the second network device may also be referred to as a candidate target network device. The first network device sends a message to the candidate target network device, to request the candidate target network device to perform handover preparation. The message may be a handover request message or another message, or may have another name. This is not limited in this application. The message includes context information of the terminal device. For example, the context information includes radio access capability information, a security parameter, a radio bearer configuration, an RRM configuration, and the like of the terminal device. After receiving the request message, the candidate target network device performs admission control. If it is determined that the terminal device is allowed to access the candidate target network device, the candidate target network device returns a message to a source network device (that is, the first network device). The message may be a handover request acknowledgment message or another message. This is not limited. The message returned by the candidate target network device includes configuration information required by the terminal device to access the candidate target network device. For example, the handover request acknowledgment message may include information that is required for accessing the candidate target cell and that is configured by the candidate target network device for the terminal device. The candidate target cell belongs to the candidate target network device. For example, the handover request acknowledgment message includes a cell identifier of the candidate target cell, frequency information of the candidate target cell, a C-RNTI allocated by the candidate target cell to the terminal device, an identifier of a first beam that belongs to the candidate target cell, and a first random access channel RACH resource. Specifically, the cell identifier includes a PCI and/or a CGI. The frequency information includes an SSB frequency (for example, absoluteFrequencySSB) of the candidate target cell and/or an absolute frequency position (for example, absoluteFrequencyPointA) of a reference resource block (common RBo) of the candidate target cell. The identifier of the first beam includes an SSB index and/or a CSI-RS index. The first random access channel RACH resource includes a first dedicated random access resource and/or a first common random access resource. The first dedicated random access resource is associated with the first beam, the first dedicated random access resource includes a first preamble index and a first time-frequency resource, and the first common random access resource includes a second time-frequency resource.

340. The first network device sends conditional handover configuration information to the terminal device.

In an implementation, the conditional handover configuration information is generated by the candidate target network device (which may also be referred to as the fourth network device). For example, in a handover preparation phase performed with the candidate target network device, the first network device may receive the conditional handover configuration information sent by the candidate target network device. Then, the first network device may directly send the conditional handover configuration information to the terminal device. In this case, all content in the conditional handover configuration information may be generated by the candidate target network device, and the first network device transparently transmits the conditional handover configuration information to the terminal device.

In another implementation, the conditional handover configuration information may be generated jointly by the candidate target network device and the first network device. For example, in a handover preparation phase performed with the candidate target network device, the first network device receives a part of content in the conditional handover configuration information, for example, the RACH resource configured by the candidate target network device for the terminal device. Then, the first network device determines the other part of content in the conditional handover configuration information, for example, an identifier of the measurement object and a signal quality threshold. The first network device sends the received part of content that is in the configuration information and that is sent by the candidate target network device and the other part of content that is in the configuration information and that is determined by the first network device to the terminal device.

For example, the conditional handover configuration information may be sent by using an RRC message. It should be understood that the message may be a new RRC message, an RRC reconfiguration message including a ReconfigurationWithSync information element, or an RRC connection reconfiguration message including a mobility control information (mobility control info) information element. This embodiment of this application is not limited thereto.

The conditional handover configuration information is used to configure a first measurement object and a handover condition threshold, and the configuration information may be associated with the measurement configuration information in step 310. For example, the configuration information may include all or some of the at least one measurement identifier in the measurement configuration information. Because the measurement identifier in the measurement configuration information is associated with the measurement object and the reporting configuration, the configuration information may not include the measurement object. In addition, because the reporting configuration includes the event type, the reference signal type, and the like, the configuration information may not include information such as the event type and the reference signal type.

For example, the configuration information includes a first measurement identifier in the at least one measurement identifier in the measurement configuration information, and the configuration information further includes the handover condition threshold corresponding to the first measurement object, where a measurement object associated with the first measurement identifier is the first measurement object.

Alternatively, the configuration information includes a first measurement identifier and a handover condition variable threshold, and the handover condition threshold is determined based on the handover condition variable threshold and a reporting condition threshold corresponding to the first measurement identifier, where a measurement object associated with the first measurement identifier is the first measurement object.

Specifically, the handover condition threshold includes a first signal quality threshold. When signal quality of the candidate target cell is greater than or equal to a sum of signal quality of the serving cell and the first signal quality threshold, the candidate target cell satisfies the trigger condition, where the candidate target cell is a cell corresponding to the first measurement object.

Alternatively, the handover condition threshold includes a second signal quality threshold and a third signal quality threshold. When the signal quality of the candidate target cell is greater than or equal to the third signal quality threshold, and the signal quality of the serving cell is less than the second signal quality threshold, the candidate target cell satisfies the trigger condition, where the candidate target cell is a cell corresponding to the first measurement object, and the third signal quality threshold is greater than or equal to the second signal quality threshold.

That is, the configuration information may include a measurement identifier (measID) (for example, the first measurement identifier) and a handover condition threshold corresponding to the measurement identifier, or include a measurement identifier and a handover condition variable threshold corresponding to the measurement identifier. For ease of description, the handover condition threshold and the handover condition variable threshold herein in this specification may be collectively referred to as delta configuration information. In other words, the configuration message may include the measurement identifier (measID) and the delta configuration information. The terminal device determines, based on measID and the delta configuration information, whether the trigger condition of the handover is satisfied. That is, the terminal device searches for a target cell based on measID and the delta configuration information. measID may be a part or all of the measurement identifier included in the measurement configuration information, for example, the first measurement identifier in the measurement configuration information. The delta configuration information uses the reporting configuration reportConfig in the measurement configuration information as a reference, and different measurement identifiers may be corresponding to different or same delta configuration information. Alternatively, a same terminal device is corresponding to only one piece of delta configuration information, and different terminal devices may be corresponding to different delta configuration information.

Specifically, if the measurement reporting event configured in reportConfig in step 310 is the event A3, the delta configuration information may be the handover condition threshold, where the handover condition threshold is equal to the first signal quality threshold. Alternatively, the delta configuration information may be the handover condition variable threshold, and a sum of the handover condition variable threshold and the first reporting condition threshold corresponding to the first measurement identifier is equal to the first signal quality threshold. In this case, when the signal quality of the cell corresponding to the first measurement object is greater than the sum of the signal quality of the serving cell and the first signal quality threshold, a handover condition is triggered, and the terminal device may determine the cell as the first target cell.

If the measurement reporting event configured in reportConfig in step 310 is the event A5, the delta configuration information may be the handover condition threshold, for example, including a first handover condition threshold and a second handover condition threshold, where the second signal quality threshold is equal to the first handover condition threshold, and the third signal quality threshold is equal to the second handover condition threshold. Alternatively, the delta configuration information may be the handover condition variable threshold, for example, including a first handover variable threshold and a second handover variable threshold, where the second signal quality threshold is equal to a sum of the first handover variable threshold and the second reporting condition threshold that corresponds to the first measurement identifier, and the third signal quality threshold is equal to a sum of the second handover variable threshold and the third reporting condition threshold that corresponds to the first measurement identifier. In this case, when the signal quality of the cell corresponding to the first measurement object is greater than the third signal quality threshold and the signal quality of the serving cell is less than the second signal quality threshold, a handover condition is triggered, and the cell may be determined as the first target cell.

It should be understood that the configuration information may include a plurality of measurement identifiers. A case in which one measurement identifier, namely, the first measurement identifier, is included is merely described above by using an example. When the configuration information includes a plurality of measurement identifiers, refer to the case in which the first measurement identifier is included. Details are not described herein again.

Optionally, the configuration information may further include a fourth signal quality threshold. That the terminal device searches for the first target cell that satisfies the trigger condition includes the following.

When the signal quality of the serving cell is less than the fourth signal quality threshold, the terminal device searches for, based on information included in the configuration information, the first target cell that satisfies the trigger condition.

In other words, when the signal quality of the serving cell is relatively good, for example, is greater than or equal to the fourth signal quality threshold, the terminal device does not need to search for the target cell. When the signal quality of the serving cell is relatively poor, for example, is less than the fourth signal quality threshold, the terminal device may search for the target cell that satisfies the trigger condition.

Therefore, in this embodiment of this application, when the signal quality of the serving cell is relatively poor, the terminal device may search for, based on the conditional handover configuration information, the target cell that satisfies the trigger condition. This can avoid an unnecessary searching process, reduce implementation complexity of the terminal device, reduce energy consumption, and ensure normal running of services.

Optionally, the conditional handover configuration information may further include at least one of the following: a cell identifier of the candidate target cell, frequency information of the candidate target cell, a C-RNTI allocated by the candidate target cell to the terminal device, an identifier of a first beam that belongs to the candidate target cell, and a first random access channel RACH resource. Specifically, the cell identifier includes a PCI and/or a CGI. The frequency information includes an SSB frequency (for example, absoluteFrequencySSB) of the candidate target cell and/or an absolute frequency position (for example, absoluteFrequencyPointA) of a reference resource block (common RBo) of the candidate target cell. The identifier of the first beam includes an SSB index and/or a CSI-RS index. The first random access channel RACH resource includes a first dedicated random access resource and/or a first common random access resource. The first dedicated random access resource is associated with the first beam, the first dedicated random access resource includes a first preamble index and a first time-frequency resource, and the first common random access resource includes a second time-frequency resource.

The terminal device determines the target cell based on the content included in the conditional handover configuration information, to access the target cell.

Optionally, the handover condition threshold corresponds to a quality level, and the quality level is used to indicate a quality value range of the serving cell.

Specifically, a plurality of handover condition thresholds may be configured by using the configuration information. In a possible implementation, different handover condition thresholds correspond to different quality levels, and the quality level is used to indicate a quality value range of the serving cell. Alternatively, in another possible implementation, different quality levels may correspond to one of the plurality of handover condition thresholds, and the quality level is used to indicate a quality value range of the serving cell. Alternatively, in another possible implementation, a same quality level may correspond to at least two of the plurality of handover condition thresholds, and the quality level is used to indicate a quality value range of the serving cell.

In other words, in this embodiment of this application, a plurality of handover condition thresholds may be configured by using the conditional handover configuration information. The terminal device may select a corresponding handover condition threshold based on a quality level of the serving cell (or a quality value range of the serving cell), and search for the target cell based on the selected handover condition threshold.

It should be understood that a case in which one handover condition threshold is configured by using the conditional handover configuration information is merely described above by using an example. In an actual application, a plurality of handover condition thresholds may be configured by using the configuration information. For each of the plurality of handover condition thresholds, refer to the foregoing description about the handover condition threshold. Details are not described herein again.

Specifically, when the plurality of handover condition thresholds are configured by using the configuration information, it indicates that a handover trigger condition provided by the network device may be multi-level. In a possible implementation, different levels of quality of the serving cell correspond to different handover condition thresholds. Correspondingly, different requirements are imposed on the quality of the candidate target cell. For example, using the event A5 as an example, two pairs of thresholds, for example, {P1, P2} and {P1', P2'}, are provided, where P1<P1' and P2<P2'. To be specific, when the quality of the serving cell is relatively poor (for example, when the quality of the serving cell is less than a threshold X, where the threshold X may be predetermined or may be included in the configuration information), a relatively low requirement may be imposed on the quality of the candidate target cell that triggers the handover condition, and the target cell may be determined by using the threshold {P1, P2}. When the quality of the serving cell is relatively good (for example, when the quality of the serving cell is greater than the threshold X), a relatively high requirement is imposed on the quality of the candidate target cell that triggers the handover condition, and the threshold {P1', P2'} may be used. In another possible implementation, different levels of quality of the serving cell may correspond to a same handover condition threshold. That is, a same requirement is imposed on the quality of the candidate target cell. For example, using the event A5 as an example, two pairs of thresholds, for example, {P1, P2} and {P1', P2'}, are provided, where P1<P1' and P2<P2'. To be specific, when the quality of the serving cell is relatively poor (for example, when the quality of the serving cell is less than a threshold Y, or when the quality of the serving cell is greater than a threshold Y and less than a threshold Z, where the threshold Y and the threshold Z may be predetermined or may be included in the configuration information), a relatively low requirement may be imposed on the quality of the candidate target cell that triggers the handover condition, and the target cell may be determined by using the threshold {P1, P2}. When the quality of the serving cell is relatively good (for example, when the quality of the serving cell is greater than the threshold Z), a relatively high requirement is imposed on the quality of the candidate target cell that triggers the handover condition, and the threshold {P1', P2'} may be used. Alternatively, in another possible implementation, a same level of quality of the serving cell may correspond to a plurality of different handover condition thresholds. That is, different requirements may be imposed on the quality of the candidate target cell. For example, using the event A5 as an example, three pairs of thresholds, for example, {P1, P2}, {P1', P2'}, and {P1", P2" }, are provided, where P1<P1'<P1" and P2<P2'<P2". To be specific, when the quality of the serving cell is relatively poor (for example, when the quality of the serving cell is less than a threshold R, where the threshold R may be predetermined or may be included in the configuration information), different requirements may be imposed on the quality of the candidate target cell that triggers the handover condition, and the target cell may be determined by using the threshold {P1, P2} or the threshold {P1', P2'}. When the quality of the serving cell is relatively good (for example, when the quality of the serving cell is greater than the threshold R), a relatively high requirement is imposed on the quality of the candidate target cell that triggers the handover condition, and the threshold {P1", P2" } may be used.

Optionally, the configuration information may further include TTT indication information, and the TTT indication information is used to indicate whether the terminal device uses a TTT mechanism to search for the first target cell.

If the TTT indication information indicates that the TTT mechanism does not need to be used, once the terminal device determines that the trigger condition is satisfied, the terminal device is handed over to the target cell that satisfies the trigger condition. If the TTT indication information indicates that the TTT mechanism needs to be used, and the candidate target cell always satisfies the trigger condition only when within a time to trigger (TTT) configured by a network, the terminal device determines the candidate target cell as the first target cell. After the time to trigger is reached, the terminal device is handed over to the first target cell that satisfies the trigger condition.

It should be understood that a length of the time to trigger corresponding to the TTT mechanism may be configured in the measurement configuration information, or may be configured in the conditional handover configuration information. This embodiment of this application is not limited thereto.

Optionally, in an implementation, the configuration information includes report-free indication information, and the report-free indication information is used to indicate the terminal device to directly perform random access to the first target cell after determining the first target cell that satisfies the trigger condition, with no need to send a measurement report to the first network device. Alternatively, in an implementation, the configuration information may not include the report-free indication information. In this case, in this embodiment of this application, it may be implicitly determined that the terminal device may not report the measurement report. For example, it is stipulated, according to a preset rule or a protocol, that after the receiving the configuration information sent by the first network device, the terminal device does not need to report the measurement report after a handover condition is triggered, but is handed over to the target cell that satisfies the trigger condition.

350. The terminal device performs random access to the target cell.

Specifically, after receiving the conditional handover configuration information, the terminal device determines whether the handover trigger condition is satisfied. In this period, the terminal device keeps transmitting data with the first network device. When the handover trigger condition is satisfied, the terminal device determines the target cell, and performs a random access process with the target cell, that is, initiates random access to the second network device corresponding to the target cell. It should be understood that the terminal device may access the target cell through a contention-free random access process or a contention-based random access process. This embodiment of this application is not limited thereto.

For example, the conditional handover configuration information includes a first RACH resource corresponding to the candidate target cell. There may be a plurality of first RACH resources, and each of the first RACH resources may correspond to at least one candidate target cell. The first RACH resource includes a first dedicated random access resource and/or a first common random access resource. The first dedicated random access resource is associated with the first beam that belongs to the candidate target cell, and the first dedicated random access resource includes a first preamble index and a first time-frequency resource. The first common random access resource includes a second time-frequency resource. Different candidate target cells may be corresponding to different first dedicated random access resources, and different candidate target cells may be corresponding to a same first common random access resource or different first common random access resources. After the terminal device determines the target cell, because the target cell is one of the candidate target cells, the terminal device may determine, based on the first RACH resource, a random access resource used for accessing the target cell, where the random access resource is included in the first RACH resource. Specifically, the terminal device may perform random access by using a dedicated random access resource corresponding to the target cell, and the random access is contention-free random access. In another possible implementation, the terminal device may perform random access by using a common random access resource corresponding to the target cell, and the random access is contention-based random access.

360. The terminal device sends an RRC message to the second network device.

Specifically, after the random access is completed, the terminal device sends the RRC message to the second network device. The RRC message may be an RRC reconfiguration complete message, or may be another message. The embodiments are not limited thereto. The RRC message is used to notify the second network device corresponding to the target cell of a completed handover.

FIG. 3 describes the case in which the conditional handover configuration information is associated with the measurement configuration information. For example, when a specified piece of information, for example, a specified measurement object (that is, a frequency), is configured in the measurement configuration information, the measurement object may not be configured in the conditional handover configuration information. For example, a measurement ID associated with the measurement object may be configured in the conditional handover configuration information, to configure the measurement object. Optionally, in an alternative solution, when a piece of information is configured in the measurement configuration information, the network device may no longer configure the piece of information by using the conditional handover configuration information, and the network device may no longer configure, by using the conditional handover configuration information, information associated with the piece of information. The conditional handover configuration information may be used to configure only information that is not configured in the measurement configuration information. For example, a first frequency is configured in the measurement configuration information. If it is intended to configure the first frequency, a second frequency, and a third frequency in the conditional handover configuration information, because the first frequency is already configured in the measurement configuration information, the conditional handover configuration information may carry information about the second frequency and the third frequency, and may not carry information about the first frequency. The terminal device may determine the first frequency, the second frequency, and the third frequency based on the measurement configuration information and the conditional handover configuration information.

As shown in FIG. 4, before the network device sends the conditional handover configuration information, the network device may further send the measurement configuration information to the terminal device. The conditional handover configuration information may not be associated with the measurement configuration information.

In other words, the embodiments provide a method for configuring a conditional handover. In the method, the configuration information provided by the network device is independent of the measurement configuration information, that is, the configuration information is not attached to the measurement configuration information. Specifically, with reference to FIG. 4, a handover method in an embodiment of this application is described in detail below. The method 400 shown in FIG. 4 includes the following steps.

410. A first network device sends an RRC reconfiguration message including measurement configuration information to a terminal device.

It should be understood that step 410 is corresponding to step 310. For related descriptions in step 410, refer to the foregoing descriptions in step 310. To avoid repetition, details are not described herein again.

420. The terminal device sends a measurement report to the first network device.

It should be understood that step 420 is corresponding to step 320. For related descriptions in step 420, refer to the foregoing descriptions in step 320. To avoid repetition, details are not described herein again.

430. The first network device performs handover preparation with a candidate target network device.

It should be understood that step 430 is corresponding to step 330. For related descriptions in step 430, refer to the foregoing descriptions in step 330. To avoid repetition, details are not described herein again.

440. The first network device sends conditional handover configuration information to the terminal device.

For example, the conditional handover configuration information may be sent by using an RRC message. It should be understood that the message may be a new RRC message, an RRC reconfiguration message including a ReconfigurationWithSync information element, or an RRC connection reconfiguration message including a mobility control information (mobility control info) information element. This embodiment of this application is not limited thereto.

The conditional handover configuration information is used to configure a first measurement object and a handover condition threshold. The first measurement object configured by using the configuration information may be the same as or different from the measurement object configured by using the measurement configuration information in step 410.

Specifically, the configuration information includes the first measurement object and the handover condition threshold.

Optionally, the configuration information further includes at least one of the following information: a measurement identifier associated with the first measurement object and the handover condition threshold, an event type (for example, A1 to A6) associated with the handover condition threshold, a hysteresis value, a time to trigger TTT, and a reference signal type.

Specifically, the handover condition threshold includes a first signal quality threshold. When signal quality of the candidate target cell is greater than or equal to a sum of signal quality of the serving cell and the first signal quality threshold, the candidate target cell satisfies the trigger condition, where the candidate target cell is a cell corresponding to the first measurement object.

Alternatively, the handover condition threshold includes a second signal quality threshold and a third signal quality threshold. When signal quality of the candidate target cell is greater than or equal to the third signal quality threshold, and the signal quality of the serving cell is less than the second signal quality threshold, the candidate target cell satisfies the trigger condition, where the candidate target cell is a cell corresponding to the first measurement object, and the third signal quality threshold is greater than or equal to the second signal quality threshold.

In other words, the configuration information may include a measurement object (measObject) and a handover condition threshold corresponding to the measurement object. The terminal device determines, based on the measurement object and the handover condition threshold corresponding to the measurement object, whether a trigger condition of the handover is satisfied. To be specific, the terminal device searches for the target cell based on the measurement object and the handover condition threshold corresponding to the measurement object.

It should be understood that the event type associated with the handover condition threshold may be the same as or different from the event type in 410, and there is no association relationship between the two event types.

Specifically, if the event type associated with the handover condition threshold is an event A3, the handover condition threshold may be the first signal quality threshold. In this case, when the signal quality of the cell corresponding to the first measurement object is greater than the sum of the signal quality of the serving cell and the first signal quality threshold, a handover condition is triggered, and the terminal device may determine the cell as the first target cell.

If the event type associated with the handover condition threshold is an event A5, the handover condition threshold may be the second signal quality threshold and the third signal quality threshold. In this case, when the signal quality of the cell corresponding to the first measurement object is greater than the third signal quality threshold and the signal quality of the serving cell is less than the second signal quality threshold, a handover condition is triggered, and the cell may be determined as the first target cell.

It should be understood that the configuration information may include a plurality of measurement objects and handover condition thresholds corresponding to the plurality of measurement objects. A case in which one measurement object, namely, the first measurement object, is included is merely described above by using an example. When the configuration information includes a plurality of measurement objects, refer to the case in which the first measurement object is included. Details are not described herein again.

Optionally, the configuration information may further include a fourth signal quality threshold. That the terminal device determines the first target cell based on the configuration information includes the following.

The terminal device determines the first target cell based on the configuration information when the signal quality of the serving cell is less than the fourth signal quality threshold. For example, the terminal device searches for, based on information included in the configuration information, the first target cell that satisfies the trigger condition.

In other words, when the signal quality of the serving cell is relatively good, for example, is greater than or equal to the fourth signal quality threshold, the terminal device does not need to search for the target cell. When the signal quality of the serving cell is relatively poor, for example, is less than the fourth signal quality threshold, the terminal device may search for the target cell that satisfies the trigger condition.

Therefore, in this embodiment of this application, when the signal quality of the serving cell is relatively poor, the terminal device may search for, based on the conditional handover configuration information, the target cell that satisfies the trigger condition. This can avoid unnecessary searching behavior, reduce implementation complexity of the terminal device, reduce energy consumption, and ensure normal running of services.

Optionally, the conditional handover configuration information may further include at least one of the following: a cell identifier of the candidate target cell, frequency information of the candidate target cell, a C-RNTI allocated by the candidate target cell to the terminal device, an identifier of a first beam that belongs to the candidate target cell, and a first random access channel RACH resource.

Specifically, the cell identifier includes a PCI and/or a CGI. The frequency information includes an SSB frequency (for example, absoluteFrequencySSB) of the candidate target cell and/or an absolute frequency position (for example, absoluteFrequencyPointA) of a reference resource block (common RBo) of the candidate target cell. The identifier of the first beam includes an SSB index and/or a CSI-RS index. The first random access channel RACH resource includes a first dedicated random access resource and/or a first common random access resource. The first dedicated random access resource is associated with the first beam, the first dedicated random access resource includes a first preamble index and a first time-frequency resource, and the first common random access resource includes a second time-frequency resource.

The terminal device determines the target cell based on the content included in the conditional handover configuration information, to access the target cell.

Optionally, the handover condition threshold corresponds to a quality level, and the quality level is used to indicate a quality value range of the serving cell.

Specifically, a plurality of handover condition thresholds may be configured by using the configuration information. In a possible implementation, different handover condition thresholds correspond to different quality levels, and the quality level is used to indicate a quality value range of the serving cell. Alternatively, in another possible implementation, different quality levels may correspond to one of the plurality of handover condition thresholds, and the quality level is used to indicate a quality value range of the serving cell. Alternatively, in another possible implementation, a same quality level may correspond to at least two of the plurality of handover condition thresholds, and the quality level is used to indicate a quality value range of the serving cell.

In other words, in this embodiment of this application, a plurality of handover condition thresholds may be configured by using the conditional handover configuration information. The terminal device may select a corresponding handover condition threshold based on a quality level of the serving cell (or a quality value range of the serving cell), and search for the target cell based on the selected handover condition threshold.

It should be understood that a case in which one handover condition threshold is configured by using the conditional handover configuration information is merely described above by using an example. In an actual application, a plurality of handover condition thresholds may be configured by using the conditional handover configuration information. For each of the plurality of handover condition thresholds, refer to the foregoing description about the handover condition threshold. Details are not described herein again.

Specifically, when a plurality of handover condition thresholds are configured by using the configuration information, it indicates that a handover trigger condition provided by the network device may be multi-level. In a possible implementation, different levels of quality of the serving cell correspond to different handover condition thresholds. Correspondingly, different requirements are imposed on the quality of the candidate target cell. For example, using the event A5 as an example, two pairs of thresholds, for example, {P1, P2} and {P1', P2'}, are provided, where P1<P1' and P2<P2'. To be specific, when the quality of the serving cell is relatively poor (for example, when the quality of the serving cell is less than a threshold X, where the threshold X may be predetermined or may be included in the configuration information), a relatively low requirement may be imposed on the quality of the candidate target cell that triggers the handover condition, and the target cell may be determined by using the threshold {P1, P2}. When the quality of the serving cell is relatively good (for example, when the quality of the serving cell is greater than the threshold X), a relatively high requirement is imposed on the quality of the candidate target cell that triggers the handover condition, and the threshold {P1', P2'} may be used. In another possible implementation, different levels of quality of the serving cell may correspond to a same handover condition threshold. That is, a same requirement is imposed on the quality of the candidate target cell. For example, using the event A5 as an example, two pairs of thresholds, for example, {P1, P2} and {P1', P2'}, are provided, where P1<P1' and P2<P2'. To be specific, when the quality of the serving cell is relatively poor (for example, when the quality of the serving cell is less than a threshold Y, or when the quality of the serving cell is greater than a threshold Y and less than a threshold Z, where the threshold Y and the threshold Z may be predetermined or may be included in the configuration information), a relatively low requirement may be imposed on the quality of the candidate target cell that triggers the handover condition, and the target cell may be determined by using the threshold {P1, P2}. When the quality of the serving cell is relatively good (for example, when the quality of the serving cell is greater than the threshold Z), a relatively high requirement is imposed on the quality of the candidate target cell that triggers the handover condition, and the threshold {P1', P2'} may be used. Alternatively, in another possible implementation, a same level of quality of the serving cell may correspond to a plurality of different handover condition thresholds. That is, different requirements may be imposed on the quality of the candidate target cell. For example, using the event A5 as an example, three pairs of thresholds, for example, {P1, P2}, {P1', P2'}, and {P1", P2" }, are provided, where P1<P1'<P1" and P2<P2'<P2". To be specific, when the quality of the serving cell is relatively poor (for example, when the quality of the serving cell is less than a threshold R, where the threshold R may be predetermined or may be included in the configuration information), different requirements may be imposed on the quality of the candidate target cell that triggers the handover condition, and the target cell may be determined by using the threshold {P1, P2} or the threshold {P1', P2'}. When the quality of the serving cell is relatively good (for example, when the quality of the serving cell is greater than the threshold R), a relatively high requirement is imposed on the quality of the candidate target cell that triggers the handover condition, and the threshold {P1", P2" } may be used.

Optionally, the configuration information may further include TTT indication information, and the TTT indication information is used to indicate whether the terminal device uses a TTT mechanism to search for the first target cell.

If the TTT indication information indicates that the TN mechanism does not need to be used, once the terminal device determines that the trigger condition is satisfied, the terminal device is handed over to the target cell that satisfies the trigger condition. If the TTT indication information indicates that the TN mechanism needs to be used, and the candidate target cell always satisfies the trigger condition only when within a time to trigger (TTT) configured by a network, the terminal device determines the candidate target cell as the first target cell. After the time to trigger is reached, the terminal device is handed over to the first target cell that satisfies the trigger condition.

It should be understood that a length of the time to trigger corresponding to the TTT mechanism may be configured in the reporting configuration, or may be configured in the conditional handover configuration information. This embodiment of this application is not limited thereto.

Optionally, in an implementation, the configuration information includes report-free indication information, and the report-free indication information is used to indicate the terminal device to directly perform random access to the first target cell after determining the first target cell that satisfies the trigger condition, with no need to send a measurement report to the first network device. Alternatively, in an implementation, the configuration information may not include the report-free indication information. In this case, in this embodiment of this application, it may be implicitly determined that the terminal device may not report the measurement report. For example, it is stipulated, according to a preset rule or a protocol, that after the receiving the configuration information sent by the first network device, the terminal device does not need to report the measurement report after a handover condition is triggered, but is handed over to the target cell that satisfies the trigger condition.

450. The terminal device performs random access to the target cell.

Specifically, after receiving the conditional handover configuration information, the terminal device determines whether the handover trigger condition is satisfied. In this period, the terminal device keeps transmitting data with the first network device. When the handover trigger condition is satisfied, the terminal device determines the target cell, and performs a random access process with the target cell, that is, initiates random access to a second network device corresponding to the target cell. It should be understood that the terminal device may access the target cell through a contention-free random access process or a contention-based random access process. This embodiment of this application is not limited thereto.

For example, the conditional handover configuration information includes a first RACH resource corresponding to the candidate target cell. There may be a plurality of first RACH resources, and each of the first RACH resources may correspond to at least one candidate target cell. The first RACH resource includes a first dedicated random access resource and/or a first common random access resource. The first dedicated random access resource is associated with the first beam that belongs to the candidate target cell, and the first dedicated random access resource includes a first preamble index and a first time-frequency resource. The first common random access resource includes a second time-frequency resource. Different candidate target cells may be corresponding to different first dedicated random access resources, and different candidate target cells may be corresponding to a same first common random access resource or different first common random access resources. After the terminal device determines the target cell, because the target cell is one of the candidate target cells, the terminal device may determine, based on the first RACH resource, a random access resource used for accessing the target cell, where the random access resource is included in the first RACH resource. Specifically, the terminal device may perform random access by using a dedicated random access resource corresponding to the target cell, and the random access is contention-free random access. In another possible implementation, the terminal device may perform random access by using a common random access resource corresponding to the target cell, and the random access is contention-based random access.

460. The terminal device sends an RRC message to the second network device.

Specifically, after the random access is completed, the terminal device sends the RRC message to the second network device. The RRC message may be an RRC reconfiguration complete message, or may be another message. The embodiments are not limited thereto. The RRC message is used to notify the second network device corresponding to the target cell of a completed handover.

As shown in FIG. 5, the network device may not separately send the measurement configuration information. In this case, the network device sends a piece of signaling, for example, an RRC message. The signaling may include the measurement configuration information shown in FIG. 3 or FIG. 4, and may further include the conditional handover configuration information shown in FIG. 3 or FIG. 4.

That is, the measurement configuration information and the conditional handover configuration information in each of the embodiments in FIG. 3 and FIG. 4 are separately sent in two different messages. The embodiments provide a method for configuring a conditional handover. In the method, the network device may send the foregoing content by using one message. That is, the conditional handover configuration information in FIG. 5 may include content of the measurement configuration information and the conditional handover configuration information in the embodiments in FIG. 3 and FIG. 4. In this case, the network device does not need to send the measurement configuration information to the terminal device by using additional dedicated signaling, thereby reducing signaling overheads. Specifically, with reference to FIG. 5, a handover method in an embodiment of this application is described in detail below. The method 500 shown in FIG. 5 includes the following steps.

510. A first network device sends conditional handover configuration information to a terminal device.

For example, the conditional handover configuration information may be sent by using an RRC message. The RRC message may be a new RRC message, an RRC reconfiguration message including a ReconfigurationWithSync information element, or an RRC connection reconfiguration message including a mobility control information (mobility control info) information element, or may have another name. This embodiment of this application is not limited thereto.

It should be understood that, for ease of differentiation, in the embodiment shown in FIG. 5, the configuration information (that is, the conditional handover configuration information) may also be referred to as second information, and the second information may include content of the conditional handover configuration information and the measurement configuration information in the embodiment in FIG. 3 or FIG. 4. For example, the second information may include two parts of information. One part of information may correspond to the conditional handover configuration information in the embodiment in FIG. 3 or FIG. 4, and the other part of information may correspond to the measurement configuration information in the embodiment in FIG. 3 or FIG. 4. In the following, for consistency of description, the word "configuration information" is still used to describe the second information in the embodiment shown in FIG. 5. However, a person skilled in the art should understand a difference between configuration information in different embodiments. For example, content included in the configuration information in the embodiment in FIG. 5 may be more than content included in the configuration information in the embodiment in FIG. 3 or FIG. 4.

The configuration information is used to configure a first measurement object and a handover condition threshold. Specifically, the configuration information includes the first measurement object and the handover condition threshold.

Optionally, the configuration information further includes at least one of the following information: a measurement identifier associated with the first measurement object and the handover condition threshold, an event type (for example, A1 to A6) associated with the handover condition threshold, a hysteresis value, a time to trigger TTT, and a reference signal type.

Specifically, the handover condition threshold includes a first signal quality threshold. When signal quality of the candidate target cell is greater than or equal to a sum of signal quality of the serving cell and the first signal quality threshold, the candidate target cell satisfies the trigger condition, where the candidate target cell is a cell corresponding to the first measurement object.

Alternatively, the handover condition threshold includes a second signal quality threshold and a third signal quality threshold. When signal quality of the candidate target cell is greater than or equal to the third signal quality threshold, and the signal quality of the serving cell is less than the second signal quality threshold, the candidate target cell satisfies the trigger condition, where the candidate target cell is a cell corresponding to the first measurement object, and the third signal quality threshold is greater than or equal to the second signal quality threshold.

In other words, the configuration information may include the measurement identifier, the first measurement object corresponding to the measurement identifier, and the handover condition threshold corresponding to the measurement identifier. The terminal device determines, based on the first measurement object corresponding to the measurement identifier and the handover condition threshold corresponding to the measurement identifier, whether a trigger condition of the handover is satisfied. That is, the terminal device searches for the target cell based on the first measurement object corresponding to the measurement identifier and the handover condition threshold corresponding to the measurement identifier.

Specifically, if the event type associated with the handover condition threshold is an event A3, the handover condition threshold may be the first signal quality threshold. In this case, when the signal quality of the cell corresponding to the first measurement object is greater than the sum of the signal quality of the serving cell and the first signal quality threshold, a handover condition is triggered, and the cell may be determined as the first target cell.

If the event type associated with the handover condition threshold is an event A5, the handover condition threshold may be the second signal quality threshold and the third signal quality threshold. In this case, when the signal quality of the cell corresponding to the first measurement object is greater than the third signal quality threshold and the signal quality of the serving cell is less than the second signal quality threshold, a handover condition is triggered, and the cell may be determined as the first target cell.

It should be understood that the configuration information may include a plurality of measurement identifiers, a plurality of measurement objects, and handover condition thresholds corresponding to the plurality of measurement objects. A case in which one measurement object, namely, the first measurement object, is included is merely described above by using an example. When the configuration information includes a plurality of measurement objects, refer to the case in which the first measurement object is included. Details are not described herein again.

Optionally, the event A3 is used as an example. The configuration information may further include another threshold, for example, a seventh signal quality threshold. For example, the first signal quality threshold is represented by L, and the seventh signal quality threshold is represented by H. In this case, when a difference between the signal quality of the cell corresponding to the first measurement object and the signal quality of the serving cell is less than L and greater than H, the terminal device may send the measurement report to the first network device, so that the first network device performs mobility management on the terminal device based on the measurement report. When the difference between the signal quality of the cell corresponding to the first measurement object and the signal quality of the serving cell is greater than L, the handover condition is triggered, and the cell may be determined as the first target cell.

It should be understood that, in an actual application, corresponding to the first measurement object, only L may be configured, and H is not configured. In other words, the terminal device may be configured not to send the measurement report corresponding to the first measurement object to the first network device. Alternatively, corresponding to the first measurement object, only H may be configured, and L is not configured. In other words, in a process of determining the target cell, the terminal device may exclude the first measurement object, that is, does not need to determine whether the cell corresponding to the first measurement object satisfies the trigger condition.

Similar to the event A3, the configuration information may further include another threshold for the event A5. Details are not described herein again.

Optionally, when the configuration information includes a plurality of thresholds for each event, for example, when the configuration information includes L and H for the event A3, the configuration information may further include reporting indication information, where the reporting indication information is used to indicate behavior of the terminal device after the event is triggered, that is, whether the terminal device reports the measurement report, or is handed over to the target cell that satisfies the trigger condition.

Optionally, the configuration information may further include a list of candidate target cells, where the list includes a PCI or a CGI of the candidate target cell. For example, if a neighboring cell of the serving cell is used as the candidate target cell, the list includes a PCI or a CGI of the neighboring cell.

It should be understood that, before sending the configuration information, the first network device does not perform handover preparation with a network device to which the candidate target cell belongs. Therefore, the candidate target cell may be blindly configured by the first network device. For example, the first network device uses, as the candidate target cell, a cell served by a neighboring network device that establishes an Xn interface with the first network device. This embodiment of this application is not limited thereto.

Therefore, based on the included list of candidate target cells, the terminal device preferentially determines, in the candidate target cells, the target cell to which the terminal device needs to be handed over.

Optionally, the configuration information may further include a fourth signal quality threshold. That the terminal device determines the first target cell based on the configuration information includes:

The terminal device determines the first target cell based on the configuration information when the signal quality of the serving cell is less than the fourth signal quality threshold. For example, the terminal device searches for, based on information included in the configuration information, the first target cell that satisfies the trigger condition.

In other words, when the signal quality of the serving cell is relatively good, for example, is greater than or equal to the fourth signal quality threshold, the terminal device does not need to search for the target cell. When the signal quality of the serving cell is relatively poor, for example, is less than the fourth signal quality threshold, the terminal device may search for the target cell that satisfies the trigger condition.

Therefore, in this embodiment of this application, when the signal quality of the serving cell is relatively poor, the terminal device may search for, based on the configuration information, the target cell that satisfies the trigger condition. This can avoid unnecessary searching behavior, reduce implementation complexity of the terminal device, reduce energy consumption, and ensure normal running of services.

Optionally, the configuration information may further include at least one of the following information: a cell identifier of the candidate target cell and frequency information of the candidate target cell. Specifically, the cell identifier includes a PCI and/or a CGI, and the frequency information includes an SSB frequency (for example, absoluteFrequencySSB) of the candidate target cell and/or an absolute frequency position (for example, absoluteFrequencyPointA) of a reference resource block (common RBo) of the candidate target cell.

The terminal device determines the target cell based on the information included in the configuration information, and accesses the target cell based on the information.

Optionally, the handover condition threshold corresponds to a quality level, and the quality level is used to indicate a quality value range of the serving cell.

Specifically, a plurality of handover condition thresholds may be configured by using the configuration information. In a possible implementation, different handover condition thresholds correspond to different quality levels, and the quality level is used to indicate a quality value range of the serving cell. Alternatively, in another possible implementation, different quality levels may correspond to one of the plurality of handover condition thresholds, and the quality level is used to indicate a quality value range of the serving cell. Alternatively, in another possible implementation, a same quality level may correspond to at least two of the plurality of handover condition thresholds, and the quality level is used to indicate a quality value range of the serving cell.

In other words, in this embodiment of this application, a plurality of handover condition thresholds may be configured by using the conditional handover configuration information (the second information). The terminal device may select a corresponding handover condition threshold based on a quality level of the serving cell (or a quality value range of the serving cell), and search for the target cell based on the selected handover condition threshold.

It should be understood that a case in which one handover condition threshold is configured by using the conditional handover configuration information (the second information) is merely described above by using an example. In an actual application, a plurality of handover condition thresholds may be configured by using the conditional handover configuration information (the second information). For each of the plurality of handover condition thresholds, refer to the foregoing description about the handover condition threshold. Details are not described herein again.

Specifically, when a plurality of handover condition thresholds are configured by using the configuration information, it indicates that a handover trigger condition provided by the network device may be multi-level.

In a possible implementation, different levels of quality of the serving cell correspond to different handover condition thresholds. Correspondingly, different requirements are imposed on the quality of the candidate target cell. For example, using the event A5 as an example, two pairs of thresholds, for example, {P1, P2} and {P1', P2'}, are provided, where P1<P1' and P2<P2'. To be specific, when the quality of the serving cell is relatively poor (for example, when the quality of the serving cell is less than a threshold X, where the threshold X may be predetermined or may be included in the configuration information), a relatively low requirement may be imposed on the quality of the candidate target cell that triggers the handover condition, and the target cell may be determined by using the threshold {P1, P2}. When the quality of the serving cell is relatively good (for example, when the quality of the serving cell is greater than the threshold X), a relatively high requirement is imposed on the quality of the candidate target cell that triggers the handover condition, and the threshold {P1', P2'} may be used. In another possible implementation, different levels of quality of the serving cell may correspond to a same handover condition threshold. That is, a same requirement is imposed on the quality of the candidate target cell. For example, using the event A5 as an example, two pairs of thresholds, for example, {P1, P2} and {P1', P2'}, are provided, where P1<P1' and P2<P2'. To be specific, when the quality of the serving cell is relatively poor (for example, when the quality of the serving cell is less than a threshold Y, or when the quality of the serving cell is greater than a threshold Y and less than a threshold Z, where the threshold Y and the threshold Z may be predetermined or may be included in the configuration information), a relatively low requirement may be imposed on the quality of the candidate target cell that triggers the handover condition, and the target cell may be determined by using the threshold {P1, P2}. When the quality of the serving cell is relatively good (for example, when the quality of the serving cell is greater than the threshold Z), a relatively high requirement is imposed on the quality of the candidate target cell that triggers the handover condition, and the threshold {P1', P2'} may be used. Alternatively, in another possible implementation, a same level of quality of the serving cell may correspond to a plurality of different handover condition thresholds. That is, different requirements may be imposed on the quality of the candidate target cell. For example, using the event A5 as an example, three pairs of thresholds, for example, {P1, P2}, {P1', P2'}, and {P1", P2" }, are provided, where P1<P1'<P1" and P2<P2'<P2". To be specific, when the quality of the serving cell is relatively poor (for example, when the quality of the serving cell is less than a threshold R, where the threshold R may be predetermined or may be included in the configuration information), different requirements may be imposed on the quality of the candidate target cell that triggers the handover condition, and the target cell may be determined by using the threshold {P1, P2} or the threshold {P1', P2'}. When the quality of the serving cell is relatively good (for example, when the quality of the serving cell is greater than the threshold R), a relatively high requirement is imposed on the quality of the candidate target cell that triggers the handover condition, and the threshold {P1", P2" } may be used.

Optionally, the configuration information may further include TTT indication information, and the TTT indication information is used to indicate whether the terminal device uses a TTT mechanism to search for the first target cell.

If the TTT indication information indicates that the TN mechanism does not need to be used, once the terminal device determines that the trigger condition is satisfied, the terminal device is handed over to the target cell that satisfies the trigger condition. If the TTT indication information indicates that the TN mechanism needs to be used, and the candidate target cell always satisfies the trigger condition only when within a time to trigger (TTT) configured by a network, the terminal device determines the candidate target cell as the first target cell. After the time to trigger is reached, the terminal device is handed over to the first target cell that satisfies the trigger condition.

It should be understood that a length of the time to trigger corresponding to the TTT mechanism may be configured in the conditional handover configuration information (the second information). This embodiment of this application is not limited thereto.

Optionally, in an implementation, the configuration information includes report-free indication information, and the report-free indication information is used to indicate the terminal device to directly perform random access to the first target cell after determining the first target cell that satisfies the trigger condition, with no need to send a measurement report to the first network device. Alternatively, in an implementation, the configuration information may not include the report-free indication information. In this case, in this embodiment of this application, it may be implicitly determined that the terminal device may not report the measurement report. For example, it is stipulated, according to a preset rule or a protocol, that after the receiving the configuration information sent by the first network device, the terminal device does not need to report the measurement report after a handover condition is triggered, but is handed over to the target cell that satisfies the trigger condition.

520. The terminal device performs random access to the target cell.

Specifically, after receiving the conditional handover configuration information (the second information), the terminal device determines whether the handover trigger condition is satisfied. In this period, the terminal device keeps transmitting data with the first network device. When the handover trigger condition is satisfied, the terminal device determines the target cell, and performs a random access process with the target cell, that is, initiates random access to a second network device corresponding to the target cell.

It should be understood that because no random access resource is configured in the conditional handover configuration information (the second information), the terminal device performs contention-based random access to the first target cell. For example, the terminal device obtains a system message (for example, a SIB 1) broadcast by the first target cell, where the system message includes a common random access resource. The terminal device performs contention-based random access to the first target cell by using the common random access resource.

530. The terminal device sends an RRC message to the second network device.

Specifically, after the random access is completed, the terminal device sends the RRC message to the second network device. The RRC message may be an RRC reconfiguration complete message, or may be another message. The embodiments are not limited thereto. The RRC message is used to notify the second network device corresponding to the target cell of a completed handover.

Specifically, the terminal device sends a first message to the second network device. It should be understood that the first message may be an RRC message, or the first message may be another message, for example, a MAC message or DCI. This embodiment of this application is not limited thereto. Specifically, the first message may be an RRC reconfiguration complete message, or may be another message. This embodiment is not limited thereto. The first message is used to notify the second network device of a successful handover of the terminal device, and the second network device is a network device to which the first target cell belongs.

The first message includes at least one of the following information: a cell radio network temporary identifier C-RNTI allocated by the serving cell to the terminal, a cell global identifier CGI of the serving cell, a physical cell identifier PCI of the serving cell, and a message authentication code for integrity MAC-I.

540. The second network device requests context information of the terminal device from the first network device.

Specifically, after obtaining the first message, the second network device finds the first network device based on information included in the first message, and sends a context request message to the first network device, to request the context information of the terminal device.

550. The first network device sends the context information of the terminal device to the second network device.

Specifically, after receiving the context request message sent by the second network device, the first network device sends the context information of the terminal device to the second network device.

It should be noted that in a process in which the terminal device searches for the target cell that satisfies the trigger condition, the signal quality of the serving cell may become relatively good. In this case, in this embodiment of this application, a handover cancellation condition may be further configured. When the handover cancellation condition is satisfied, the terminal device may cancel the searching process, and keep communicating with a source cell. Specific examples of canceling a conditional handover in the embodiments of this application are separately described below with respect to the embodiments in FIG. 3 to FIG. 5.

As shown in FIG. 6, a method for canceling a conditional handover is provided for the embodiments in FIG. 3 and FIG. 4. After receiving conditional handover configuration information that includes a handover cancellation condition and that is provided by a network device, a terminal device determines whether a cancellation condition is satisfied. Once the cancellation condition is satisfied, the terminal device cancels a procedure of searching for a target cell. Specifically, with reference to FIG. 6, the method for canceling a conditional handover in an embodiment of this application is described in detail below. The method 600 shown in FIG. 6 includes the following steps.

610. A first network device sends an RRC reconfiguration message including measurement configuration information to a terminal device.

It should be understood that step 610 is corresponding to step 310. For related descriptions in step 610, refer to the foregoing descriptions in step 310. To avoid repetition, details are not described herein again.

620. The terminal device sends a measurement report to the first network device.

It should be understood that step 620 is corresponding to step 320. For related descriptions in step 620, refer to the foregoing descriptions in step 320. To avoid repetition, details are not described herein again.

630. The first network device performs handover preparation with a candidate target network device.

It should be understood that step 630 is corresponding to step 330. For related descriptions in step 630, refer to the foregoing descriptions in step 330. To avoid repetition, details are not described herein again.

640. The first network device sends conditional handover configuration information to the terminal device.

It should be understood that, in step 640, for the conditional handover configuration information, refer to the description in step 340 or step 440. The conditional handover configuration information may include all content of the conditional handover configuration information described in step 340 or step 440.

Further, on this basis, the conditional handover configuration information may further include a cancellation condition, where whether the handover cancellation condition is satisfied is determined based on the cancellation condition and signal quality of the serving cell and/or signal quality of the candidate target cell.

The cancellation condition includes a fifth signal quality threshold. When the signal quality of the serving cell is greater than the fifth signal quality threshold, the handover cancellation condition is satisfied. The terminal device cancels the searching process, and continues to keep connecting to/transmitting data with a source cell.

Alternatively, the cancellation condition includes a sixth signal quality threshold. When the signal quality of the candidate target cell is less than a sum of the sixth signal quality threshold and the signal quality of the serving cell, the handover cancellation condition is satisfied. The terminal device cancels the searching process and continues to keep connecting to/transmitting data with a source cell.

For example, using an event A3 as an example, the conditional handover configuration information further includes the sixth signal quality threshold in addition to the first signal quality threshold (for example, the first signal quality threshold is represented by G) that is for triggering the handover and that is described in the embodiment in FIG. 3 or FIG. 4. The sixth signal quality threshold is a threshold that enables the terminal device to exit an execution process of determining whether a handover trigger condition is satisfied. For example, the sixth signal quality threshold is represented by S. If a difference between the signal quality of the candidate target cell and the signal quality of the serving cell is less than S, the terminal device releases content included in the conditional handover configuration information, exits the process of determining whether the handover trigger condition is satisfied, and continues to keep connecting to/transmitting data with the source cell. If the difference between the signal quality of the candidate target cell and the signal quality of the serving cell is greater than G, the terminal device is handed over to the candidate target cell that satisfies the trigger condition.

Specifically, in a process in which the terminal device searches for the first target cell that satisfies the trigger condition, if the handover cancellation condition is satisfied, the terminal device cancels the searching process, and continues to communicate with the serving cell.

650. The terminal device releases the conditional handover configuration information.

Specifically, when the terminal device determines that the cancellation condition is satisfied, the terminal device releases the conditional handover configuration information, that is, releases all or some of the information included in the configuration information.

660. The terminal device sends a notification message to the first network device.

Specifically, the notification message is used to indicate the first network device to release the conditional handover configuration information.

670. The first network device releases the conditional handover configuration information.

That is, after receiving the notification message sent by the terminal device, the first network device releases all or some of the information included in the conditional handover configuration information.

Alternatively, in another embodiment, in this application, the terminal device may not send a notification message to the first network device. For example, after sending the conditional handover configuration information, the first network device may release the configuration information. For another example, the first network device may alternatively release the configuration information according to a timer. This embodiment of this application is not limited thereto.

680. The first network device sends a release notification message to the candidate target network device.

Specifically, the release notification message is used to indicate the candidate target network device that performs handover preparation in advance to release stored information such as a context of the terminal device, a reserved RACH resource, and a C-RNTI allocated to the terminal device.

Alternatively, in another embodiment, in this application, the first network device may not send a release notification message to the candidate target network device. For example, the candidate target network device may release, according to a timer, stored information such as a context of the terminal device, a reserved RACH resource, and a C-RNTI allocated to the terminal device. This embodiment of this application is not limited thereto.

In this embodiment of this application, the terminal device may be handed over from the serving cell (that is, the source cell) to the target cell when the handover trigger condition is satisfied. In an actual application, there may be a scenario in which the handover trigger condition is never satisfied or a conditional handover procedure does not need to be performed. This embodiment provides the method for canceling a conditional handover. When a condition for triggering cancellation of a conditional handover is satisfied, the information included in the configuration information is deleted, and a reserved resource is released, so that storage overheads and a waste of resources can be reduced.

It should be understood that FIG. 6 describes only a method for canceling a conditional handover procedure in a process of searching for a target cell. In an actual application, the conditional handover procedure may also be canceled in a random access process. This embodiment of this application is not limited thereto. For example, in a process in which the terminal device performs the random access to the first target cell, if the handover cancellation condition is satisfied, the terminal device cancels the random access process, and continues to communicate with the serving cell.

As shown in FIG. 7, a method for canceling a conditional handover is provided for the embodiment in FIG. 5. After receiving conditional handover configuration information (second information) that includes a handover cancellation condition and that is provided by a network device, a terminal device determines whether a cancellation condition is satisfied. Once the cancellation condition is satisfied, the terminal device cancels a procedure of searching for a target cell. Specifically, with reference to FIG. 7, the method for canceling a conditional handover in an embodiment of this application is described in detail below. The method 700 shown in FIG. 7 includes the following steps.

710. A first network device sends conditional handover configuration information to a terminal device.

It should be understood that, in step 710, for the conditional handover configuration information, refer to the description in step 510. The conditional handover configuration information may include all content of the conditional handover configuration information described in step 510.

Further, on this basis, the conditional handover configuration information may further include a cancellation condition, where whether the handover cancellation condition is satisfied is determined based on the cancellation condition and signal quality of the serving cell and/or signal quality of the candidate target cell.

The cancellation condition includes a fifth signal quality threshold. When the signal quality of the serving cell is greater than the fifth signal quality threshold, the handover cancellation condition is satisfied. The terminal device cancels a conditional handover procedure, that is, cancels the process of searching for the target cell, and continues to keep connecting to/transmitting data with a source cell.

Alternatively, the cancellation condition includes a sixth signal quality threshold. When the signal quality of the candidate target cell is less than a sum of the sixth signal quality threshold and the signal quality of the serving cell, the handover cancellation condition is satisfied. The terminal device cancels a conditional handover procedure, and continues to keep connecting to/transmitting data with a source cell.

For example, using an event A3 as an example, the configuration information further includes the sixth signal quality threshold in addition to the first signal quality threshold (for example, the first signal quality threshold is represented by G) that is for triggering the handover and that is described in the embodiment in FIG. 5. The sixth signal quality threshold is a threshold that enables the terminal device to exit an execution process of determining whether a handover trigger condition is satisfied. For example, the sixth signal quality threshold is represented by S. If a difference between the signal quality of the candidate target cell and the signal quality of the serving cell is less than S, the terminal device releases information included in the configuration information, exits the process of determining whether the handover trigger condition is satisfied, and continues to keep connecting to/transmitting data with the source cell. If the difference between the signal quality of the candidate target cell and the signal quality of the serving cell is greater than G, the terminal device is handed over to the candidate target cell that satisfies the trigger condition.

Specifically, in a process in which the terminal device searches for the first target cell that satisfies the trigger condition, if the handover cancellation condition is satisfied, the terminal device cancels the searching process, and continues to communicate with the serving cell.

720. The terminal device releases the conditional handover configuration information.

Specifically, when the terminal device determines that the cancellation condition is satisfied, the terminal device releases the conditional handover configuration information, that is, releases all or some of the information included in the configuration information.

730. The terminal device sends a notification message to the first network device.

Specifically, the notification message is used to indicate the first network device to release the conditional handover configuration information.

740. The first network device releases the conditional handover configuration information.

That is, after receiving the notification message sent by the terminal device, the first network device releases all or some of the information included in the conditional handover configuration information.

Alternatively, in another embodiment, in this application, the terminal device may not send a notification message to the first network device. For example, after sending the conditional handover configuration information, the first network device may release the configuration information. For another example, the first network device may alternatively release the configuration information according to a timer. This embodiment of this application is not limited thereto.

In this embodiment of this application, the terminal device may be handed over from the serving cell (that is, the source cell) to the target cell when the handover trigger condition is satisfied. In an actual application, there may be a case in which the handover trigger condition is never satisfied or a conditional handover procedure does not need to be performed. This embodiment provides the method for canceling a conditional handover. When a condition for triggering cancellation of a conditional handover is satisfied, the information included in the conditional handover configuration information is deleted, and a reserved resource is released, so that storage overheads and a waste of resources can be reduced.

It should be understood that FIG. 7 describes only a method for canceling a conditional handover procedure in a process of searching for a target cell. In an actual application, the conditional handover procedure may also be canceled in a random access process. This embodiment of this application is not limited thereto. For example, in a process in which the terminal device performs the random access to the first target cell, if the handover cancellation condition is satisfied, the terminal device cancels the random access process, and continues to communicate with the serving cell.

As shown in FIG. 8, based on FIG. 3 or FIG. 4, in a process in which a terminal device searches for a target cell, the terminal device may further receive a handover message that includes information about a second target cell and that is sent by a first network device. In this case, the terminal device may flexibly perform a handover based on the handover message. Specifically, with reference to FIG. 8, a handover method in an embodiment of this application is described in detail below. The method 800 shown in FIG. 8 includes the following steps.

810. A first network device sends an RRC reconfiguration message including measurement configuration information to a terminal device.

It should be understood that step 810 is corresponding to step 310. For related descriptions in step 810, refer to the foregoing descriptions in step 310. To avoid repetition, details are not described herein again.

820. The terminal device sends a measurement report to the first network device.

It should be understood that step 820 is corresponding to step 320. For related descriptions in step 820, refer to the foregoing descriptions in step 320. To avoid repetition, details are not described herein again.

830. The first network device performs handover preparation with a candidate target network device.

It should be understood that step 830 is corresponding to step 330. For related descriptions in step 830, refer to the foregoing descriptions in step 330. To avoid repetition, details are not described herein again.

840. The first network device sends conditional handover configuration information to the terminal device.

It should be understood that, in step 840, for the conditional handover configuration information, refer to the description in step 340 or step 440. The conditional handover configuration information may include all content of the conditional handover configuration information described in step 340 or step 440.

Specifically, after obtaining the conditional handover configuration information, the terminal device searches for a target cell (that is, the first target cell in the foregoing description) based on the configuration information.

850. The first network device sends a handover message to the terminal device.

Specifically, after the terminal device obtains the conditional handover configuration information, when a handover trigger condition is still not satisfied, that is, when the terminal device has not found the first target cell or in a process in which the terminal device searches for the first target cell that satisfies the trigger condition, the terminal device receives the handover message sent by the first network device. The handover message includes an identifier of the second target cell and a random access resource required for accessing the second target cell.

Specifically, the handover message may be an RRC message. For example, the handover message may be an RRC reconfiguration message that includes a synchronization reconfiguration (ReconfigurationWithSync) information element or an RRC connection reconfiguration message that carries a mobility control information (mobility control info) information element. The handover message includes at least one of the following information, for example, the identifier (for example, a PCI) of the second target cell, an identifier (for example, an SSB index and/or a CSI-RS index) of a second beam belonging to the second target cell, a beam threshold (for example, rsrp-ThresholdSSB or rsrp-ThresholdCSI-RS), and a second random access channel resource required for accessing the second target cell. There may be a plurality of identifiers of second beams, and there may be one or more second RACH resources, where the second RACH resources may be different. The second random access channel resource includes a second dedicated random access resource and/or a second common random access resource. The second dedicated random access resource is associated with the second beam belonging to the second target cell, the second dedicated random access resource includes a second preamble index and a third time-frequency resource, the second common random access resource includes a fourth time-frequency resource, and different identifiers of second beams may be associated with different second dedicated random access resources.

It should be noted that, if the second target cell included in the handover message is one of the candidate target cells that perform handover preparation in step 830, before sending the handover message, the first network device may or may not need to perform handover preparation with a network device to which the second target cell belongs. If the second target cell included in the handover message is not one of the candidate target cells that perform handover preparation in step 830, before sending the handover message, the first network device needs to perform handover preparation with a third network device to which the second target cell belongs. For a specific handover preparation process, refer to the description in step 330. Details are not described herein again. It should be understood that the third network device and the second network device in this application may be a same network device, or may be different network devices. This embodiment of this application is not limited thereto.

860. After the terminal device receives the handover message, the terminal device stops the process of searching for the first target cell, and performs random access to the second target cell based on the second random access channel resource.

Specifically, the terminal device selects, from the second beams, a third beam whose signal quality is higher than the beam threshold and on which the second dedicated random access resource is configured, to perform a contention-free random access process, where the third beam is one of the second beams, and the third beam belongs to the second target cell.

Alternatively, if contention-free random access processes performed by the terminal device on all beams whose signal quality is higher than the beam threshold and on which the second dedicated random access resource is configured all fail, that is, when the terminal device fails to perform contention-free random access to the second target cell, the terminal device continues to search for, based on the conditional handover configuration information, the first target cell that satisfies the trigger condition. For example, the terminal device determines, by using the cell identifier of the candidate target cell, the frequency information of the candidate target cell, the C-RNTI allocated by the candidate target cell to the terminal device, the identifier of the first beam belonging to the candidate target cell, and the first random access channel RACH resource that are included in the conditional handover configuration information in step 840, the first target cell from candidate target cells that satisfy the handover trigger condition, and preferentially selects a first beam that is in the first target cell and on which the first dedicated random access resource is configured, to perform random access to the first target cell. Specifically, the cell identifier includes a PCI and/or a CGI. The frequency information includes an SSB frequency (for example, absoluteFrequencySSB) of the candidate target cell and/or an absolute frequency position (for example, absoluteFrequencyPointA) of a reference resource block (common RBo) of the candidate target cell. The identifier of the first beam includes an SSB index and/or a CSI-RS index. The first random access channel RACH resource includes a first dedicated random access resource and/or a first common random access resource. The first dedicated random access resource is associated with the first beam, the first dedicated random access resource includes a first preamble index and a first time-frequency resource, and the first common random access resource includes a second time-frequency resource.

870. After completing the RACH procedure with the second target cell, the terminal device sends an RRC reconfiguration complete message to the third network device to which the second target cell belongs.

It should be understood that, if the terminal device fails to perform random access to the second target cell (for example, the terminal device fails to perform contention-free RACH to the second target cell, the terminal device fails to perform contention-based RACH to the second target cell, or the terminal device fails to perform contention-free RACH or contention-based RACH to the second target cell), the terminal device may redetermine the first target cell based on the conditional handover configuration information. For a subsequent process, refer to the foregoing description, and details are not described herein again. In other words, step 870 is optional, and step 870 is performed only when the terminal device successfully performs random access to the second target cell.

Specifically, step 870 may be replaced with the following content: After the terminal device completes the RACH procedure to the target cell, the terminal device sends the RRC reconfiguration complete message to the network device to which the target cell belongs. In this case, the target cell may be the second target cell (corresponding to a case in which the terminal device successfully performs random access to the second target cell), or may be the first target cell (corresponding to a case in which the terminal device fails to perform random access to the second target cell). This embodiment of this application is not limited thereto.

Optionally, after sending the RRC reconfiguration complete message, the terminal device releases the conditional handover configuration information.

Specifically, when the target cell determined by the terminal device is the first target cell, after sending the RRC reconfiguration complete message to the second network device, the terminal device releases the conditional handover configuration information. Alternatively, when the target cell determined by the terminal device is the second target cell, after sending the RRC reconfiguration complete message to the third network device, the terminal device releases the conditional handover configuration information.

That is, in this embodiment of this application, after completing the handover, the terminal device releases the conditional handover configuration information.

It should be understood that, in this embodiment of this application, in an implementation, that the terminal device "completes the handover" means that the terminal device determines the first target cell based on the conditional handover configuration information, and is successfully handed over to the first target cell. In this case, the terminal device needs to send the RRC reconfiguration complete message to the second network device.

In another implementation, that the terminal device "completes the handover" means that in a process in which the terminal device determines the first target cell based on the conditional handover configuration information, the terminal device receives the handover message and is successfully handed over to the second target cell configured in the handover message. In this case, the terminal device needs to send the RRC reconfiguration complete message to the third network device.

In another implementation, that the terminal device "completes the handover" means that in a process in which the terminal device determines the first target cell based on the conditional handover configuration information, when the terminal device receives the handover message and fails to be handed over to the second target cell, the terminal device determines the first target cell based on the conditional handover configuration information, and is successfully handed over to the first target cell. In this case, the terminal device needs to send the RRC reconfiguration complete message to the second network device.

It should be understood that, generally, the terminal device may not immediately release the conditional handover configuration information after receiving the handover message. When the terminal device is successfully handed over to the second target cell, the terminal device may release the conditional handover configuration information, to ensure that when the handover to the second target cell fails, the terminal device may determine the first target cell based on the conditional handover configuration information, and is handed over to the first target cell, to prevent the terminal device from performing RRC re-establishment when the terminal device fails to be handed over to the second target cell, thereby reducing a transmission interruption. Optionally, in this embodiment of this application, after obtaining the handover message, the terminal device may directly release the conditional handover configuration information, to release a storage space in a timely manner.

It should be understood that releasing the conditional handover configuration information in this embodiment of this application may also be referred to as deleting the conditional handover configuration information. This embodiment of this application is not limited thereto.

880. The third network device sends a release notification message to the first network device.

Specifically, after receiving the RRC reconfiguration complete message, the third network device sends the release notification message to the first network device.

It should be understood that step 880 describes only a case in which the third network device indicates the first network device to release the configuration information when the terminal device is successfully handed over to the second target cell.

Alternatively, if the terminal device is successfully handed over to the first target cell, the terminal device sends the RRC reconfiguration complete message to the second network device to which the first target cell belongs. In this case, step 880 may be replaced with the following: The second network device sends a release notification message to the first network device, to indicate the first network device to release the conditional handover configuration information.

Further, in this embodiment of this application, when the third network device sends the release notification message to the first network device, the first network device may further send a release notification message to another candidate target network device different from the third network device, to indicate the another network device to release context information of the terminal device, a resource allocated to the terminal device, and the like.

Further, in this embodiment of this application, when the second network device sends the release notification message to the first network device, the first network device may further send a release notification message to another candidate target network device different from the second network device, to indicate the another network device to release context information of the terminal device, a resource allocated to the terminal device, and the like.

890. The first network device releases the conditional handover configuration information.

Specifically, after receiving the release notification message sent by the third network device, the first network device releases the conditional handover configuration information, disconnects an RRC connection/data transmission from the terminal device, and indicates a network device (that is, the candidate target network device) to which the candidate target cell belongs to release stored information such as a context of the terminal device, a reserved RACH resource, and a C-RNTI allocated to the terminal device.

In this embodiment of this application, after the terminal device completes the handover, the terminal device and the network device release the foregoing information, so that a waste of resources can be avoided.

In the process of searching for the first target cell, the terminal device may further receive the handover message that carries the information about the second target cell and that is sent by the network device. In this case, the terminal device may flexibly perform the handover based on the handover message.

It should be understood that the foregoing describes an example in which the terminal device releases the conditional handover configuration information after the handover is completed, to release the storage space. Optionally, in an actual application, the terminal device may not release the conditional handover configuration information. This embodiment of this application is not limited thereto.

It should be understood that the foregoing examples in FIG. 2 to FIG. 8 are merely intended to help a person skilled in the art understand the embodiments of this application, but are not intended to limit the embodiments of this application to a specific value or a specific scenario in the examples. It is clearly that, a person skilled in the art may make various equivalent modifications or changes based on the examples in FIG. 2 to FIG. 8. For example, a person skilled in the art may combine and split a plurality of embodiments based on the examples in FIG. 2 to FIG. 8. Such modifications or changes in the embodiments of this application also fall within the scope of the embodiments of this application.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

It may be understood that in the foregoing method embodiments, a method implemented by the terminal device may alternatively be implemented by a component (for example, a chip or a circuit) that may be used in the terminal, and a method implemented by the network device may alternatively be implemented by a component (for example, a chip or a circuit) that may be used in the network device. The foregoing describes in detail the methods in the embodiments of this application with reference to FIG. 1 to FIG. 8. The following describes communications apparatuses in the embodiments of this application with reference to FIG. 9 to FIG. 12.

Figure 9:
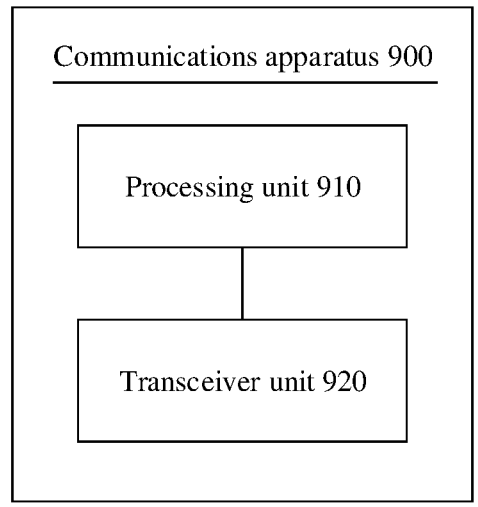
FIG. 9 is a schematic block diagram of a communications apparatus according to this application.

FIG. 9 is a schematic structural diagram of a communications apparatus according to an embodiment of this application. The communications apparatus 900 may include: a processing unit 910 and a transceiver unit 920.

Specifically, the transceiver unit is configured to receive conditional handover configuration information from a first network device, where the first network device is a network device to which a serving cell belongs, and the serving cell is a cell that currently accessed by the communications apparatus.

The processing unit is configured to determine a first target cell based on the conditional handover configuration information.

In this embodiment of this application, the first network device sends the configuration information to the communications apparatus (for example, a terminal device). For example, the first network device sends the configuration information to the terminal device when link communication quality is relatively good, so that a success rate of sending the configuration information can be ensured. Further, the terminal device determines the target cell based on the configuration information, and performs random access to the determined target cell, to complete a handover procedure, thereby improving a handover success rate.

Optionally, the conditional handover configuration information is used to configure a first measurement object and a handover condition threshold, where a measurement result of the first measurement object and the handover condition threshold are used to determine whether a trigger condition of a conditional handover is satisfied.

The processing unit may be configured to: determine a candidate target cell that corresponds to the first measurement object and that satisfies the trigger condition as the first target cell based on the measurement result of the first measurement object and the handover condition threshold.

Optionally, before the transceiver unit receives the conditional handover configuration information from the first network device, the transceiver unit is further configured to: receive measurement configuration information from the first network device, where the measurement configuration information includes at least one measurement identifier, and a measurement object and a reporting configuration that are associated with each measurement identifier, and the reporting configuration is used to configure a reporting event and a reporting condition threshold corresponding to the reporting event, where the configuration information includes a first measurement identifier and the handover condition threshold; or the conditional handover configuration information includes a first measurement identifier and a handover condition variable threshold, where the handover condition threshold is determined based on the handover condition variable threshold and a reporting condition threshold associated with the first measurement identifier, where the first measurement identifier is one of the at least one measurement identifier, and a measurement object associated with the first measurement identifier is the first measurement object.

Optionally, the conditional handover configuration information includes the first measurement object and the handover condition threshold.

Optionally, the conditional handover configuration information further includes at least one of the following information: a measurement identifier associated with the first measurement object and the handover condition threshold, an event corresponding to the handover condition threshold, a hysteresis value, and a time to trigger TTT.

Optionally, the transceiver unit is further configured to: send a first message to a second network device, where the first message is used to notify the second network device of a successful handover of the terminal device, and the second network device is a network device to which the first target cell belongs.

The first message includes at least one of the following information: a cell radio network temporary identifier C-RNTI allocated by the serving cell to the terminal, a cell global identifier CGI of the serving cell, a physical cell identifier PCI of the serving cell, and a message authentication code for integrity MAC-I.

Optionally, the conditional handover configuration information and the measurement configuration information are received by the transceiver unit by using one piece of signaling.

Optionally, the conditional handover configuration information includes at least one of the following information: a cell identifier of the candidate target cell, frequency information of the candidate target cell, a C-RNTI allocated by the candidate target cell to the terminal device, an identifier of a first beam that belongs to the candidate target cell, and a first random access channel RACH resource.

Optionally, the handover condition threshold includes a first signal quality threshold, where when signal quality of the candidate target cell is greater than or equal to a sum of signal quality of the serving cell and the first signal quality threshold, the candidate target cell satisfies the trigger condition; or the handover condition threshold includes a second signal quality threshold and a third signal quality threshold, where when signal quality of the candidate target cell is greater than or equal to the third signal quality threshold, and signal quality of the serving cell is less than the second signal quality threshold, the candidate target cell satisfies the trigger condition, where the third signal quality threshold is greater than or equal to the second signal quality threshold.

Optionally, the handover condition threshold corresponds to a quality level, and the quality level is used to indicate a quality value range of the serving cell.

Optionally, the conditional handover configuration information includes TTT indication information, and the TTT indication information is used to indicate whether the terminal device uses a TTT mechanism to determine the first target cell.

Optionally, the conditional handover configuration information includes report-free indication information, and the report-free indication information is used to indicate the terminal device to directly perform random access to the first target cell after determining the first target cell that satisfies the trigger condition, without sending a measurement report to the first network device.

Optionally, the conditional handover configuration information includes a fourth signal quality threshold.

The processing unit may be configured to: determine the first target cell based on the conditional handover configuration information when the signal quality of the serving cell is less than the fourth signal quality threshold.

Optionally, the conditional handover configuration information is further used to configure a handover cancellation condition. The processing unit is further configured to: in a process of determining the first target cell that satisfies the trigger condition, if the handover cancellation condition is satisfied, cancel the determining process, and continue to communicate with the serving cell.

Optionally, the configuration information includes a cancellation condition, where whether the handover cancellation condition is satisfied is determined based on the cancellation condition and the signal quality of the serving cell and/or the signal quality of the candidate target cell.

Optionally, the cancellation condition includes a fifth signal quality threshold, and when the signal quality of the serving cell is greater than the fifth signal quality threshold, the handover cancellation condition is satisfied; or the cancellation condition includes a sixth signal quality threshold, and when the signal quality of the candidate target cell is less than a sum of the sixth signal quality threshold and the signal quality of the serving cell, the handover cancellation condition is satisfied.

Optionally, the processing unit may be configured to control the transceiver unit to send a notification message to the first network device, where the notification message is used to indicate the first network device to release the configuration information.

Optionally, in a process in which the processing unit determines the first target cell that satisfies the trigger condition, the transceiver unit is further configured to: receive a handover message sent by the first network device, where the handover message includes an identifier of a second target cell and a dedicated random access resource required for accessing the second target cell, and the dedicated random access resource includes a preamble index and a time-frequency resource; and stop the determining process, and perform contention-free random access to the second target cell based on the dedicated random access resource.

The processing unit may be configured to continue to determine, based on the conditional handover configuration information when the contention-free random access to the second target cell fails, the first target cell that satisfies the trigger condition.

Optionally, after the terminal device completes the handover, the processing unit is further configured to: release the conditional handover configuration information.

In this embodiment of this application, the first network device sends the configuration information to the terminal device. For example, the first network device sends the configuration information to the terminal device when link communication quality is relatively good, so that a success rate of sending the configuration information can be ensured. Further, the terminal device determines the target cell based on the configuration information, and performs random access to the determined target cell, to complete a handover procedure, thereby improving a handover success rate.

The communications apparatus 900 provided in this application may correspond to processes performed by the terminal device in the method embodiments in FIG. 2 to FIG. 8. For a function of each unit/module in the communications apparatus, refer to the foregoing descriptions. Detailed descriptions are appropriately omitted herein.

It should be understood that, the communications apparatus in FIG. 9 may be a terminal device, or may be a chip or an integrated circuit that may be used in a terminal device.

Figure 10:
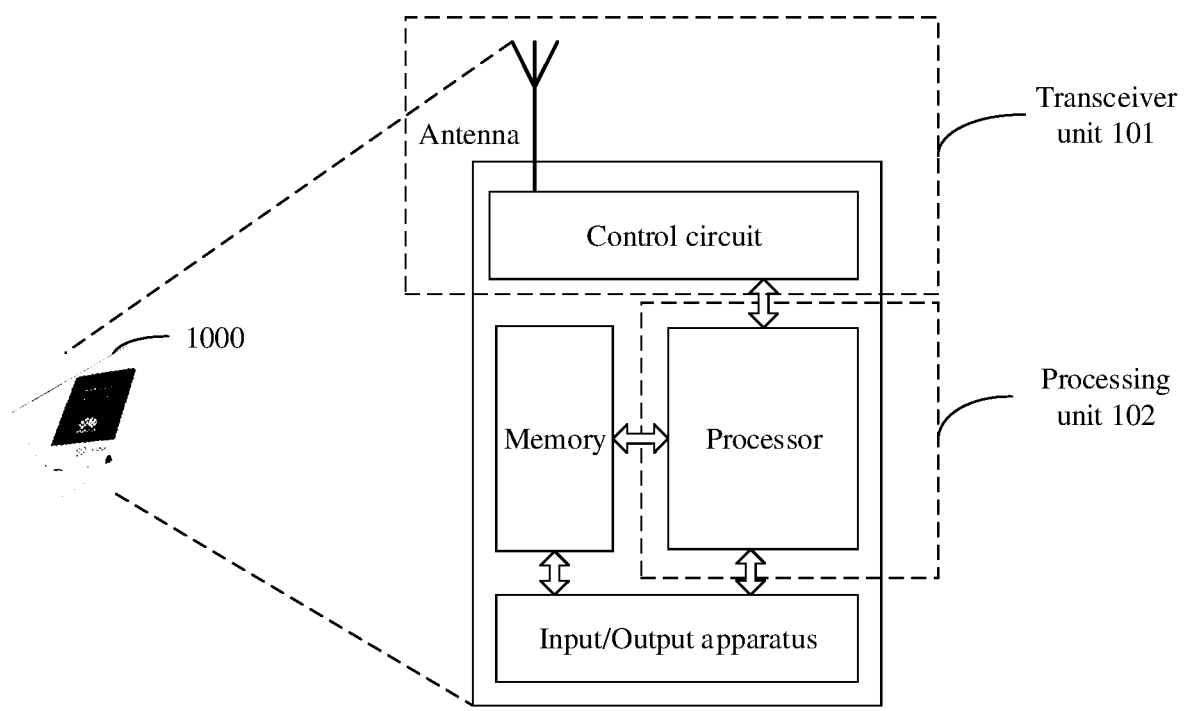
FIG. 10 is a schematic block diagram of a terminal device according to this application.

For example, the communications apparatus is a terminal device. FIG. 10 is a schematic structural diagram of a terminal device according to an embodiment of this application. For ease of understanding and illustration, in FIG. 10, for example, the terminal device is a mobile phone. FIG. 10 shows only main components of the terminal device. The terminal device 1000 shown in FIG. 10 includes a processor, a memory, a control circuit, and an antenna. Optionally, the terminal device may further include an input/output apparatus. It should be understood that, the control circuit may be disposed in the processor, or may be located outside the processor and exists independently. This is not limited in this embodiment of this application. The processor is mainly configured to process a communication protocol and communication data, control the entire terminal device, execute a software program, and process data of the software program, for example, configured to support the terminal device in performing the actions described in the foregoing method embodiments. The memory is mainly configured to store the software program and the data. The control circuit is mainly configured to perform conversion between a baseband signal and a radio frequency signal and process the radio frequency signal. The control circuit, together with the antenna, may also be referred to as a transceiver that is mainly configured to send and receive a radio frequency signal in an electromagnetic wave form. The input/output apparatus, such as a touchscreen, a display, or a keyboard, is mainly configured to: receive data entered by a user, and output data to the user.

After the terminal device is powered on, the processor may read a software program in a storage unit, explain and execute an instruction of the software program, and process data of the software program. When data needs to be sent in a wireless manner, the processor performs baseband processing on to-be-sent data, and then outputs a baseband signal to a radio frequency circuit. After performing radio frequency processing on the baseband signal, the radio frequency circuit sends a radio frequency signal to the outside by using the antenna in an electromagnetic wave form. When data is sent to the terminal device, the radio frequency circuit receives a radio frequency signal via the antenna, converts the radio frequency signal into a baseband signal, and outputs the baseband signal to the processor. The processor converts the baseband signal into data, and processes the data.

A person skilled in the art may understand that for ease of description, FIG. 1 shows only one memory and one processor. Actually, the terminal device may include a plurality of processors and a plurality of memories. The memory may also be referred to as a storage medium, a storage device, or the like. This is not limited in the embodiments of this application. It should be understood that, the memory may be integrated in the processor, or may be located outside the processor and exists independently. This is not limited in this embodiment of this application.

In an optional implementation, the processor may include a baseband processor and a central processing unit. The baseband processor is mainly configured to process the communication protocol and the communication data, and the central processing unit is mainly configured to: control the entire terminal device, execute the software program, and process the data of the software program. Functions of the baseband processor and the central processing unit may be integrated into the processor in FIG. 10. A person skilled in the art may understand that the baseband processor and the central processing unit each may be an independent processor, and are interconnected by using a technology such as a bus. The person skilled in the art may understand that the terminal device may include a plurality of baseband processors to adapt to different network standards, the terminal device may include a plurality of central processing units to improve a processing capability of the terminal device, and parts of the terminal device may be connected by using various buses. The baseband processor may also be expressed as a baseband processing circuit or a baseband processing chip. The central processing unit may also be expressed as a central processing circuit or a central processing chip. A function of processing the communication protocol and communication data may be embedded into the processor, or may be stored in the storage unit in a form of a software program, so that the processor executes the software program to implement a baseband processing function.

In this embodiment of the present invention, a control circuit and an antenna that has transmitting and receiving functions may be considered as a transceiver unit 101 of the terminal device 1000, for example, configured to support the terminal device in performing the transmitting and receiving functions performed by the terminal device in the method embodiments shown in FIG. 2 to FIG. 8. A processor having a processing function is considered as a processing unit 102 of the terminal device 1000, and corresponds to the processing unit 910 in FIG. 9. As shown in FIG. 10, the terminal device 1000 includes the transceiver unit 101 and the processing unit 102. The transceiver unit may also be referred to as a transceiver, a transceiver machine, a transceiver apparatus, or the like. The transceiver unit corresponds to the transceiver unit 920 in FIG. 9. Optionally, a device configured to implement the receiving function in the transceiver unit 101 may be considered as a receiving unit, and a device configured to implement the sending function in the transceiver unit 101 may be considered as a sending unit. In other words, the transceiver unit 101 includes the receiving unit and the sending unit. The receiving unit may also be referred to as a receiver, an input port, a receiver circuit, or the like. The sending unit may be referred to as a transmitter machine, a transmitter, a transmitter circuit, or the like. It may be understood that the transceiver unit may also be an interface circuit.

The processing unit 102 may be configured to execute an instruction stored in the memory, to control the transceiver unit 101 to receive a signal and/or send a signal to complete a function of the terminal device in the foregoing method embodiments. In an implementation, it may be considered that the functions of the transceiver unit 101 are implemented by using a transceiver circuit or a transceiver-dedicated chip.

It should be understood that, the terminal device 1000 shown in FIG. 10 can implement processes related to the terminal device in the method embodiments in FIG. 2 to FIG. 8. The operations and/or the functions of the modules in the terminal device 1000 are intended to implement corresponding procedures in the foregoing method embodiments. For details, refer to the descriptions in the foregoing method embodiments. To avoid repetition, detailed descriptions are appropriately omitted herein.

Figure 11:
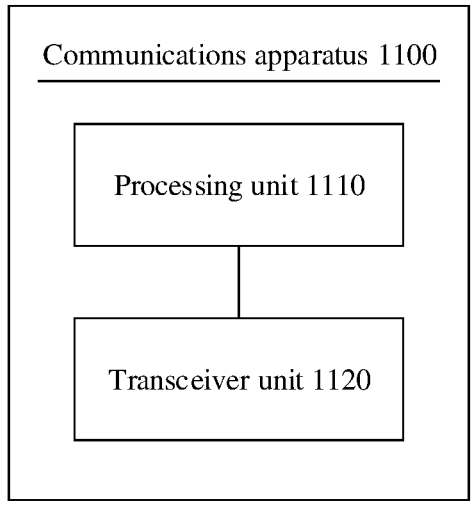
FIG. 11 is a schematic block diagram of another communications apparatus according to this application.

FIG. 11 is a schematic structural diagram of a communications apparatus according to an embodiment of this application. The apparatus 1100 may include: a processing unit 1110 and a transceiver unit 1120.

Specifically, the processing unit is configured to generate conditional handover configuration information, where the communications apparatus is an apparatus to which a serving cell belongs, and the serving cell is a cell that currently accessed by a terminal device.

The transceiver unit is configured to send the conditional handover configuration information, where the conditional handover configuration information is used by the terminal device to determine a first target cell.

In this embodiment of this application, the communications apparatus (for example, the first network device) sends the configuration information to the terminal device. For example, the first network device sends the configuration information to the terminal device when link communication quality is relatively good, so that a success rate of sending the configuration information can be ensured. Further, the terminal device determines the target cell based on the configuration information, and performs random access to the determined target cell, to complete a handover procedure, thereby improving a handover success rate.

Optionally, the conditional handover configuration information is used to configure a first measurement object and a handover condition threshold, where a measurement result of the first measurement object and the handover condition threshold are used to determine whether a trigger condition of a conditional handover is satisfied.

Optionally, before the transceiver unit sends the conditional handover configuration information, the transceiver unit is further configured to: send measurement configuration information, where the measurement configuration information includes at least one measurement identifier, and a measurement object and a reporting configuration that are associated with each measurement identifier, and the reporting configuration is used to configure a reporting event and a reporting condition threshold corresponding to the reporting event, where the configuration information includes a first measurement identifier and the handover condition threshold; or the conditional handover configuration information includes a first measurement identifier and a handover condition variable threshold, where the handover condition threshold is determined based on the handover condition variable threshold and a reporting condition threshold associated with the first measurement identifier, where the first measurement identifier is one of the at least one measurement identifier, and a measurement object associated with the first measurement identifier is the first measurement object.

Optionally, the conditional handover configuration information includes the first measurement object and the handover condition threshold.

Optionally, the conditional handover configuration information further includes at least one of the following information: a measurement identifier associated with the first measurement object and the handover condition threshold, an event corresponding to the handover condition threshold, a hysteresis value, and a time to trigger TTT.

Optionally, the conditional handover configuration information and the measurement configuration information are received by the terminal device by using one piece of signaling.

Optionally, the conditional handover configuration information includes at least one of the following information: a cell identifier of the candidate target cell, frequency information of the candidate target cell, a C-RNTI allocated by the candidate target cell to the terminal device, an identifier of a first beam that belongs to the candidate target cell, and a first random access channel RACH resource.

Optionally, the handover condition threshold includes a first signal quality threshold, where when signal quality of the candidate target cell is greater than or equal to a sum of signal quality of the serving cell and the first signal quality threshold, the candidate target cell satisfies the trigger condition; or the handover condition threshold includes a second signal quality threshold and a third signal quality threshold, where when signal quality of the candidate target cell is greater than or equal to the third signal quality threshold, and signal quality of the serving cell is less than the second signal quality threshold, the candidate target cell satisfies the trigger condition, where the third signal quality threshold is greater than or equal to the second signal quality threshold.

Optionally, the handover condition threshold corresponds to a quality level, and the quality level is used to indicate a quality value range of the serving cell.

Optionally, the conditional handover configuration information includes TTT indication information, and the TTT indication information is used to indicate whether the terminal device uses a TTT mechanism to determine the first target cell.

Optionally, the conditional handover configuration information includes report-free indication information, and the report-free indication information is used to indicate the terminal device to directly perform random access to the first target cell after determining the first target cell that satisfies the trigger condition, without sending a measurement report to the first network device.

Optionally, the conditional handover configuration information includes a fourth signal quality threshold.

The conditional handover configuration information is used by the terminal device to determine the first target cell when the signal quality of the serving cell is less than the fourth signal quality threshold.

Optionally, the conditional handover configuration information is further used to configure a handover cancellation condition.

The conditional handover configuration information is used to: in a process in which the terminal device determines the first target cell that satisfies the trigger condition, if the handover cancellation condition is satisfied, cancel the determining process, and continue to communicate with the serving cell.

Optionally, the configuration information includes a cancellation condition, where whether the handover cancellation condition is satisfied is determined based on the cancellation condition and the signal quality of the serving cell and/or the signal quality of the candidate target cell.

Optionally, the cancellation condition includes a fifth signal quality threshold, and when the signal quality of the serving cell is greater than the fifth signal quality threshold, the handover cancellation condition is satisfied; or the cancellation condition includes a sixth signal quality threshold, and when the signal quality of the candidate target cell is less than a sum of the sixth signal quality threshold and the signal quality of the serving cell, the handover cancellation condition is satisfied.

Optionally, the transceiver unit is further configured to: receive a notification message sent by the terminal device, where the notification message is used to indicate to release the configuration information.

Optionally, the transceiver unit is further configured to: send a handover message to the terminal device, where the handover message includes an identifier of a second target cell and a dedicated random access resource required for accessing the second target cell, and the dedicated random access resource includes a preamble index and a time-frequency resource.

The conditional handover configuration information is used by the terminal device to continue to determine, based on the conditional handover configuration information when contention-free random access to the second target cell fails, the first target cell that satisfies the trigger condition.

The communications apparatus 1100 provided in this application may correspond to processes performed by the first network device in the method embodiments in FIG. 2 to FIG. 8. For a function of each unit/module in the communications apparatus, refer to the foregoing descriptions. Detailed descriptions are appropriately omitted herein.

It should be understood that, the communications apparatus in FIG. 11 may be a network-side device, or may be a chip or an integrated circuit that may be used in a network-side device.

It should be understood that the network-side device may represent any network device that communicates with the terminal device, or may represent an entirety formed by a plurality of network devices that communicate with the terminal device. This embodiment of this application is not limited thereto.

Figure 12:
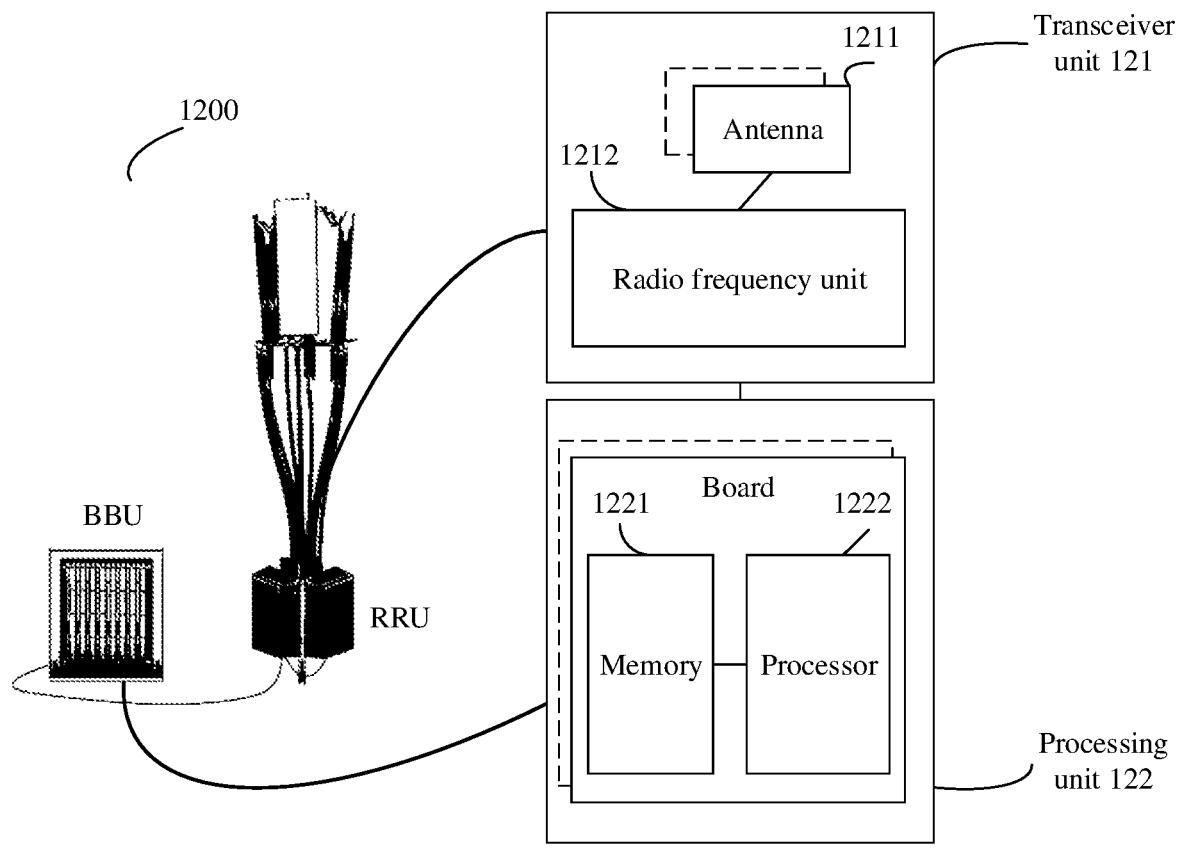
FIG. 12 is a schematic block diagram of a network device according to this application.

For example, the communications apparatus is a network device communicating with the terminal device. FIG. 12 is a schematic structural diagram of a network device according to an embodiment of this application, for example, may be a schematic structural diagram of a base station. As shown in FIG. 12, the network device 1200 may be applied to the system shown in FIG. 1, and may perform functions of the first network device in the foregoing method embodiments.

The network device 1200 may include one or more radio frequency units, for example, a remote radio unit (RRU) 121 and one or more baseband units (BBU) (which may also be referred to as a digital unit (DU)) 122. The RRU 121 may be referred to as a transceiver unit 121, and corresponds to the transceiver unit 1120 in FIG. 11. Optionally, the transceiver unit may be further referred to as a transceiver machine, a transceiver circuit, a transceiver, or the like, and may include at least one antenna 1211 and a radio frequency unit 1212. The RRU 121 is mainly configured to receive and send a radio frequency signal and perform conversion between a radio frequency signal and a baseband signal, for example, configured to send precoding matrix information to a terminal device. The BBU 122 is mainly configured to perform baseband processing, control the base station, and the like. The RRU 121 and the BBU 122 may be physically disposed together, or may be physically disposed separated, namely, a distributed base station. It may be understood that the transceiver unit may also be an interface circuit.

The BBU 122 is a control center of the base station, or may be referred to as a processing unit 122. The BBU 122 may correspond to the processing unit 1110 in FIG. 11, and is mainly configured to implement a baseband processing function, for example, channel coding, multiplexing, modulation, or spreading. For example, the BBU (the processing unit) may be configured to control the base station to perform an operation procedure related to the network device in the foregoing method embodiments.

In an example, the BBU 122 may include one or more boards, and a plurality of boards may jointly support a radio access network (for example, an LTE network) having a single access standard, or may separately support radio access networks (for example, an LTE network, a 5G network, or another network) having different access standards. The BBU 122 further includes a memory 1221 and a processor 1222. The memory 1221 is configured to store a necessary instruction and necessary data. The processor 1222 is configured to control the base station to perform a necessary action, for example, is configured to control the base station to perform an operation procedure related to the network device in the foregoing method embodiments. It should be understood that, the memory may be integrated in the processor, or may be located outside the processor and exists independently. This is not limited in this embodiment of this application. The memory 1221 and the processor 1222 may serve one or more boards. In other words, a memory and a processor may be separately disposed on each board. Alternatively, the plurality of boards may share a same memory and a same processor. In addition, a necessary circuit may be further disposed on each board.

It should be understood that, the network device 1200 shown in FIG. 12 can implement various processes related to the network device in the method embodiments in FIG. 2 to FIG. 8. The operations and/or the functions of the modules in the network device 1200 are intended to implement corresponding procedures in the foregoing method embodiments. For details, refer to the descriptions in the foregoing method embodiments. To avoid repetition, detailed descriptions are appropriately omitted herein.

An embodiment of this application further provides a processing apparatus, including a processor and an interface. The processor is configured to perform the communication method in any one of the foregoing method embodiments.

It should be understood that, the processing apparatus may be a chip. For example, the processing apparatus may be a field programmable gate array (FPGA), an application-specific integrated circuit (ASIC), a system on chip (SoC), a central processing unit (CPU), a network processor (NP), a digital signal processor (DSP), a micro controller unit (MCU), a programmable logic device (PLD), or another integrated chip.

In an implementation process, steps in the foregoing methods can be implemented by using a hardware integrated logic circuit in the processor, or by using instructions in a form of software. The steps of the method disclosed with reference to the embodiments of this application may be directly performed and completed by a hardware processor, or may be performed by a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should be noted that, the processor in the embodiments of this application may be an integrated circuit chip, and has a signal processing capability. In an implementation process, steps in the foregoing method embodiments may be implemented by using a hardware integrated logic circuit in the processor or an instruction in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in the embodiments of this application. The general-purpose processor may be a microprocessor, or the processor may be any conventional processor or the like. Steps of the methods disclosed with reference to the embodiments of this application may be directly performed and completed by using a hardware decoding processor, or may be performed and completed by using a combination of hardware and a software module in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in the embodiments of this application may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synch link DRAM, SLDRAM), and a direct rambus dynamic random access memory (direct Rambus RAM, DR RAM). It should be noted that the memory of the systems and methods described in this specification includes but is not limited to these memories and any memory of another appropriate type.

An embodiment of this application further provides a communications system, including the foregoing network device and terminal device.

An embodiment of this application further provides a computer-readable medium. The computer-readable medium stores a computer program, and when the computer program is executed by a computer, the method in any one of the foregoing method embodiments is implemented.

An embodiment of this application further provides a computer program product. When the computer program product is executed by a computer, the method in any one of the foregoing method embodiments is implemented.

All or some of the foregoing embodiments may be implemented through software, hardware, firmware, or any combination thereof. When software is used to implement the embodiments, all or some of the embodiments may be implemented in a form of a computer program product. The computer program product includes one or more computer instructions. When the computer instructions are loaded and executed on the computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

It should be understood that, although the foregoing describes a communication method in downlink transmission in a communications system, this application is not limited to this. Optionally, a solution similar to that in the foregoing description may also be used in uplink transmission. To avoid repetition, details are not described again herein.

In the foregoing apparatus embodiments, the network device and the terminal device completely correspond to the network device or the terminal device in the method embodiments. A corresponding module or unit performs a corresponding step. For example, a sending module (transmitter) performs a sending step in the method embodiments, a receiving module (receiver) performs a receiving step in the method embodiments, and except sending and receiving, other steps may be performed by a processing module (processor). For a function of a specific module, refer to corresponding method embodiments. The sending module and the receiving module may form a transceiver module, and the transmitter and the receiver may form a transceiver to jointly implement receiving and sending functions. There may be one or more processors.

In this application, "at least one" means one or more, and "a plurality of" means two or more than two. The term "and/or" describes an association relationship for describing associated objects and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one of a, b, or c may indicate: a, b, c, a and b, a and c, b and c, or a, b, and c, where a, b, and c may be singular or plural.

It should be understood that "one embodiment" or "an embodiment" mentioned in the entire specification means that particular features, structures, or characteristics related to the embodiment are included in at least one embodiment of this application. Therefore, "in one embodiment" or "in an embodiment" appearing throughout the entire specification does not necessarily refer to a same embodiment. In addition, the particular features, structures, or characteristics may be combined in one or more embodiments by using any appropriate manner. It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

The terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As shown in figures, both a computing device and an application that runs on a computing device may be components. One or more components may reside within a process and/or an execution thread, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the internet interacting with another system by using the signal).

A person of ordinary skill in the art may be aware that, in combination with illustrative logical blocks described in the embodiments disclosed in this specification and steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
    receiving conditional handover configuration information from a first network device, wherein the first network device is a network device to which a serving cell belongs, and the serving cell is a cell that is currently accessed by a terminal device;
    determining a first target cell based on the conditional handover configuration information, wherein determining the first target cell comprises:
        receiving a handover message from the first network device in a process of determining the first target cell, wherein the handover message comprises an identifier of a second target cell and a dedicated random access resource required for accessing the second target cell, and the dedicated random access resource comprises a preamble index and a time-frequency resource;
        stopping determining the first target cell based on the conditional handover configuration information, and performing contention-free random access to the second target cell based on the dedicated random access resource; and
        determining, based on the conditional handover configuration information when the contention-free random access to the second target cell fails, the first target cell.

2. The method according to claim 1, wherein the conditional handover configuration information configures a first measurement object and a handover condition threshold, wherein a measurement result of the first measurement object and the handover condition threshold are used to determine whether a trigger condition of a conditional handover is satisfied; and
    wherein determining the first target cell based on the conditional handover configuration information comprises:
        determining a candidate target cell that corresponds to the first measurement object and that satisfies the trigger condition as the first target cell based on the measurement result of the first measurement object and the handover condition threshold.

3. The method according to claim 2, wherein the conditional handover configuration information comprises the first measurement object and the handover condition threshold.

4. The method according to claim 3, wherein the conditional handover configuration information further comprises at least one of the following information:
a measurement identifier associated with the first measurement object and the handover condition threshold, an event corresponding to the handover condition threshold, a hysteresis value, or a time to trigger (TTT).

5. The method according to claim 2, wherein the conditional handover configuration information comprises at least one of the following information:
a cell identifier of the candidate target cell, frequency information of the candidate target cell, a C-RNTI allocated by the candidate target cell to the terminal device, an identifier of a first beam that belongs to the candidate target cell, or a first random access channel (RACH) resource.

6. The method according to claim 2, wherein:
the handover condition threshold comprises a first signal quality threshold, wherein when a difference between signal quality of the candidate target cell and signal quality of the serving cell is greater than or equal to the first signal quality threshold, the candidate target cell satisfies the trigger condition; or
the handover condition threshold comprises a second signal quality threshold and a third signal quality threshold, wherein when signal quality of the candidate target cell is greater than or equal to the third signal quality threshold, and signal quality of the serving cell is less than the second signal quality threshold, the candidate target cell satisfies the trigger condition, wherein the third signal quality threshold is greater than or equal to the second signal quality threshold.

7. The method according to claim 2, wherein the handover condition threshold corresponds to a quality level, and the quality level indicates a quality value range of the serving cell.

8. The method according to claim 1, wherein after a handover is completed, the method further comprises:
releasing the conditional handover configuration information.

9. The method according to claim 8, wherein the handover is completed when the terminal device is successfully handed over to the first target cell.

10. A system, comprising:
a terminal device; and
a first target network device;
wherein the terminal device is configured to:
receive conditional handover configuration information from a source network device; and
determine the first target network device based on the conditional handover configuration information, wherein determining the first target network device comprises:
receiving a handover message from the source network device in a process of determining the first target network device, wherein the handover message comprises an identifier of a second target network device and a dedicated random access resource required for accessing the second target network device, and the dedicated random access resource comprises a preamble index and a time-frequency resource;
stopping determining the first target network device based on the conditional handover configuration information, and performing contention-free random access to the second target network device based on the dedicated random access resource; and
determining, based on the conditional handover configuration information when the contention-free random access to the second target network device fails, the first target network device.

11. The system according to claim 10, wherein the first target network device is configured to:
send a message B to the source network device to indicate to the source network device to release conditional handover configuration information.

12. The system according to claim 10, wherein the first target network device is configured to:
send a message B to indicate to the source network device to indicate to other one or more candidate network devices of the terminal device to release context information of the terminal device and a reserved resource to the terminal device.

13. The system according to claim 10, wherein the first target network device is configured to receive a message A from the terminal device for completing a handover procedure to the first target network device, and the message A is a radio resource control reconfiguration complete message.

14. The system according to claim 10, wherein the first target network device is configured to:
receive, from the terminal device, a message A for completing a handover procedure to the first target network device; and
send a message B to indicate to the source network device to initiate a procedure for releasing resources for conditional handover of the terminal device.

15. An apparatus, comprising:
at least one processor; and
a non-transitory memory coupled with the processor and storing instructions that, when executed by the processor, cause the apparatus to:
receive conditional handover configuration information from a first network device, wherein the first network device is a network device to which a serving cell belongs, and the serving cell is a cell that is currently accessed by a terminal device;
determine a first target cell based on the conditional handover configuration information, wherein determining the first target cell comprises:
receiving a handover message from the first network device in a process of determining the first target cell, wherein the handover message comprises an identifier of a second target cell and a dedicated random access resource required for accessing the second target cell, and the dedicated random access resource comprises a preamble index and a time-frequency resource;
stopping the determining the first target cell based on the conditional handover configuration information, and perform contention-free random access to the second target cell based on the dedicated random access resource; and determining, based on the conditional handover configuration information when the contention-free random access to the second target cell fails, the first target cell.

16. The apparatus according to claim 15, wherein the instructions, when executed by the processor, further cause the apparatus to:
release the conditional handover configuration information when a handover is completed.

17. The apparatus according to claim 16, wherein the handover is completed when the terminal device is successfully handed over to the first target cell.

18. The apparatus according to claim 15, wherein the conditional handover configuration information is used to configure a first measurement object and a handover condition threshold, wherein a measurement result of the first measurement object and the handover condition threshold are used to determine whether a trigger condition of a conditional handover is satisfied; and
wherein the instructions, when executed by the processor, further cause the apparatus to:
determine a candidate target cell that corresponds to the first measurement object and that satisfies the trigger condition as the first target cell based on the measurement result of the first measurement object and the handover condition threshold.

19. The apparatus according to claim 18, wherein the conditional handover configuration information comprises the first measurement object and the handover condition threshold.

* * * * *

UNITED STATES PATENT AND TRADEMARK OFFICE
CERTIFICATE OF CORRECTION

PATENT NO. : 11,997,556 B2
APPLICATION NO. : 17/358746
DATED : May 28, 2024
INVENTOR(S) : Yan et al.

It is certified that error appears in the above-identified patent and that said Letters Patent is hereby corrected as shown below:

In the Specification

In Column 39, Line 46, delete "TN" and insert -- TTT --.

In Column 39, Line 51, delete "TN" and insert -- TTT --.

In Column 45, Line 61, delete "TN" and insert -- TTT --.

In Column 45, Line 66, delete "TN" and insert -- TTT --.

In Column 60, Line 5, delete "FIG. 1" and insert -- FIG. 10 --.

Signed and Sealed this
Sixteenth Day of July, 2024

Katherine Kelly Vidal
*Director of the United States Patent and Trademark Office*